(12) United States Patent
Beech

(10) Patent No.: US 9,840,277 B1
(45) Date of Patent: Dec. 12, 2017

(54) TOW BAR CONTROLLED TRAILER STEERING SYSTEM

(71) Applicant: Geoffrey S. Beech, Madison, AL (US)

(72) Inventor: Geoffrey S. Beech, Madison, AL (US)

( * ) Notice: Subject to any disclaimer, the term of this patent is extended or adjusted under 35 U.S.C. 154(b) by 52 days.

(21) Appl. No.: 14/686,744

(22) Filed: Apr. 14, 2015

Related U.S. Application Data

(63) Continuation-in-part of application No. 13/628,261, filed on Sep. 27, 2012, now Pat. No. 9,004,519.

(60) Provisional application No. 61/626,961, filed on Sep. 28, 2011.

(51) Int. Cl.

| | |
|---|---|
| *B62D 13/00* | (2006.01) |
| *B62D 13/02* | (2006.01) |
| *B60D 1/145* | (2006.01) |
| *B60D 1/24* | (2006.01) |

(52) U.S. Cl.
CPC .......... *B62D 13/02* (2013.01); *B60D 1/145* (2013.01); *B60D 1/246* (2013.01)

(58) Field of Classification Search
CPC ................................ B62D 13/00; B62D 13/02
USPC ........................................ 280/444, 445, 448
See application file for complete search history.

(56) References Cited

U.S. PATENT DOCUMENTS

| | | | | |
|---|---|---|---|---|
| 1,756,239 A | * | 4/1930 | Chojnacki ............... | B62D 13/04 280/103 |
| 2,485,853 A | * | 10/1949 | Willet .................... | B62D 13/06 280/444 |
| 3,012,638 A | * | 12/1961 | Morlik ..................... | B60T 7/20 188/142 |
| 3,605,088 A | * | 9/1971 | Savelli ................... | B62D 15/02 116/31 |
| 4,153,132 A | * | 5/1979 | Biedebach ............. | B62D 13/00 180/420 |
| 5,304,142 A | * | 4/1994 | Liebl ................. | A61M 25/0097 604/165.02 |
| 6,158,759 A | * | 12/2000 | Perry ..................... | B62D 13/04 280/444 |
| 6,273,446 B1 | * | 8/2001 | Paul ...................... | B62D 13/06 280/442 |
| 7,905,507 B2 | * | 3/2011 | Perri ..................... | B60D 1/173 280/455.1 |
| 9,004,519 B1 | * | 4/2015 | Beech .................... | B62D 13/04 280/442 |

* cited by examiner

*Primary Examiner* — Tony H. Winner

(74) *Attorney, Agent, or Firm* — Mark Clodfelter

(57) ABSTRACT

A steering system for a trailer is disclosed. A drawbar is attached to an elongated slide, with the slide attached to the trailer for rotation about a pivot axis. A carriage is mounted for movement along the slide and between ends of the slide. At least one control rod extends between the carriage and a steered wheel of the trailer. With the carriage positioned to one side of the pivot axis, the trailer wheels are steered in the direction of sideways towbar displacement when towed, and with the carriage positioned to the other side of the pivot axis, the trailer wheels are steered in the opposite direction of sideways towbar displacement when backed. An electrical, hydraulic, pneumatic or manual actuator may be used to move and position the carriage on the slide.

10 Claims, 21 Drawing Sheets

TOW BAR CONTROLLED TRAILER STEERING SYSTEM

CROSS REFERENCE TO RELATED APPLICATIONS

This application is a continuation-in-part application of Applicant's U.S. patent application Ser. No. 13/628,261, filed Sep. 27, 2012, and which issued as U.S. Pat. No. 9,004,519 on Apr. 14, 2015, which is incorporated in its entirety by reference herein and which claimed the benefit of Applicant's provisional application No. 61/626,961, filed Sep. 28, 2011, also incorporated in its entirety herein.

FIELD OF THE INVENTION

This application relates to steering systems for trailers, and more particularly to a steering system that is switchable between a towing position for towing and a backing position for backing to steer the trailer wheels during both towing and backing in accordance with sideways towbar displacement.

BACKGROUND OF THE INVENTION

A center of turning of a trailer is the point about which a trailer will readily turn when pushed or pulled under nominal operations. For most traditional single-axle automotive trailers with a tow bar rigidly attached to the trailer and pivot attachment about the tow vehicle hitch, the center of turning is at the midpoint between the trailer's wheels. For a dual axle trailer, the center of turning is between the wheels in both lateral and longitudinal directions. During nominal operation, the pitch and yaw inertia of this type trailer are accelerated about the center of turning of the trailer. Such acceleration of these pitch and yaw forces develops reaction loads on the tow vehicle hitch that are transmitted to the tow vehicle, causing it to feel unsteady at times and subjecting suspension components, steering components and tires of the tow vehicle to additional or undue wear. These accelerated pitch and yaw forces are proportional to the distance between the center of turning of the trailer and the tow vehicle hitch. When the center of mass of a trailer and its cargo is displaced off the center of turning, as may be common in many operations, and when trailer is subjected to the road imperfections, wind and weather conditions, the single pivot trailer imparts lateral, or side loads, at the hitch and receiver connection.

Two-axle, tow bar-steered agricultural wagons have been a fixture on the rural American landscape for generations. These trailers can be functionally classified into two groups. Steered-axle trailers have a pivot between the front wheels, the pivot connected to a towbar such that when the towbar is moved to one side or the other, the wheels and axle are turned about the pivot along with the towbar. The other type farm trailer is provided with a pivot on or near a front axle between the front wheels, with a towbar connected between a pivot and hitch on the towing vehicle. Pivoting connecting rods are connected on the towbar just forward of the pivot, and extend and pivotally connect to a respective steering arm attached to a respective wheel, the wheels conventionally supported for horizontal rotation about a generally vertical kingpin, ball joints or the like. As such, when the towbar is moved to one side or the other, the connecting rods pull or push the wheels to rotate about the kingpin, turning the front wheels to steer the wagon according to sideways movement of the towbar. It is noted that this type steering is called parallel steering, because the steering arms are angled to maintain the wheels in parallel relation at al times. Children's toy wagons and gardening wagons may employ similar construction. Because these trailers cannot be backed up due to a steering instability, they are not generally considered road worthy.

Most modern vehicles and trailers that actively steer their wheels employ steering geometry generally known as Ackerman steering. This type of steering accommodates the facts that, during a turn, the outer wheel travels a further distance than the inside wheel. The implication of this is that, in order for both the inside wheel and outside wheel to track properly, they must be turned to different angles. In other words, for any given turn a vehicle takes, the outside wheel will be turned, with respect to a straight ahead steering position, less than the inside wheel. This is implemented by angling the steering arms such that they each point to a common point generally centered on the rear axle. This geometry ensures that, for any given turn there will be a common point at which the rear axle and front axles will be directed. Since this common point is the center about which the vehicle turns, and the wheel axles all point directly at this common point, it is thus ensured that, since the wheels are perpendicular to their respective axles, the wheels accurately track around the turn without scrubbing, which would otherwise cause excessive wear to the tires and vehicle components.

For anyone who owns a recreational boat, vehicle or the like transported by a trailer to where the vehicle or boat is used, the problems of backing a trailer are well known. The single or double axle trailer becomes a vehicle steered by the towbar, which is attached to the towing vehicle via a hitch that allows the towbar to pivot from side to side, and also accommodates some vertical pivoting. To back a trailer, the driver is required to steer in an opposite direction to what he would normally steer when travelling forward, with the added length of a towbar magnifying any errors he might make. For a simple single or double axle trailer, the rule of thumb is for the driver to steer with his hands on the bottom of the steering wheel, and move the wheel in the direction he wants the rear of the trailer to go. While this can be difficult, it can be mastered with practice. However, for trailers such as a farm trailer as described above where the front wheels are steered by the towbar, backing of such a trailer can be almost impossible.

Attempts have been made to overcome this problem. In U.S. Pat. No. 4,208,063, to Baker, a trailer is disclosed that comprises a sub-frame for each steered axle that rotates based on an articulation angle between trailer hitch and receiver when the trailer is backed. When towed in a forward direction, no attempt to steer the trailer wheels is made. Drawbacks of Baker are that the tow vehicle hitch must be modified, and the trailer cannot be used with an unmodified tow vehicle.

U.S. Pat. No. 4,824,135, to McGregor, discloses a trailer with a steering system coupled to a tow vehicle steering mechanism about a single pivot at the hitch and receiver connection. In one embodiment, the rear axle of a dual axle trailer is connected to the tow vehicle steering mechanism, while the wheels of the steered front axle are connected to each other through a tow rod, but not with active control. McGregor also discloses a vertically pivoting hitch for accommodating pitching motions of the trailer, but the pivot is at the bumper. Here, pitching motions of the trailer impart large forces to the bumper of the tow vehicle. Like Baker, the hitch and tow vehicle must be modified, and the towed trailer cannot be towed by an unmodified tow vehicle.

U.S. Pat. No. 5,244,226, to Bergh, discloses a single steered-axle trailer with a single pivot at the tow vehicle hitch/receiver that steers opposite the articulation angle between tow vehicle and trailer when in reverse mode and steers at the same angle when in forward mode. However, Bergh carries only one pivot, at the hitch/receiver, and one steered axle. While Bergh improves reverse steering performance for a single axle trailer, the addition of a second axle would cause excessive wheel scrubbing during operation. Also, as discussed above, the hitch and tow vehicle of Bergh must be modified, and the trailer thereof cannot be towed by an unmodified hitch on another vehicle.

In each of Baker, McGregor and Bergh, the center of turning of their respective trailers is at the center between the wheels, with pitch and yaw reaction loads proportional to the distance between the center of turning and the tow vehicle hitch. As the capacity and size of the trailer increases, there is a corresponding requirement for a larger tow vehicle to stabilize the pitch and yaw reaction loads in addition to providing sufficient pulling and braking forces.

Bartel 2011/042154 discloses a system and method for controlling a trailer whereby the trailer uses a load sensor to signal a microprocessor that automatically signals propulsion and braking commands on a trailer. Without controlled steering, uneven application of drive torque at the trailer wheel would induce large lateral reaction forces at the trailer hitch/receiver.

In view of the foregoing, it is apparent that a need exists for a trailer steering system that will allow a steered trailer to be easily backed, and which uses a conventional ball hitch or other conventional hitch, and which in embodiments requires little to no additional modifications to a tow vehicle or to a tow vehicle hitch, and reduces or eliminates side forces imparted on the tow vehicle hitch and provides for improved automatic control of trailer propulsion and braking functions.

DETAILED DESCRIPTION OF THE DRAWINGS

Figure 1:
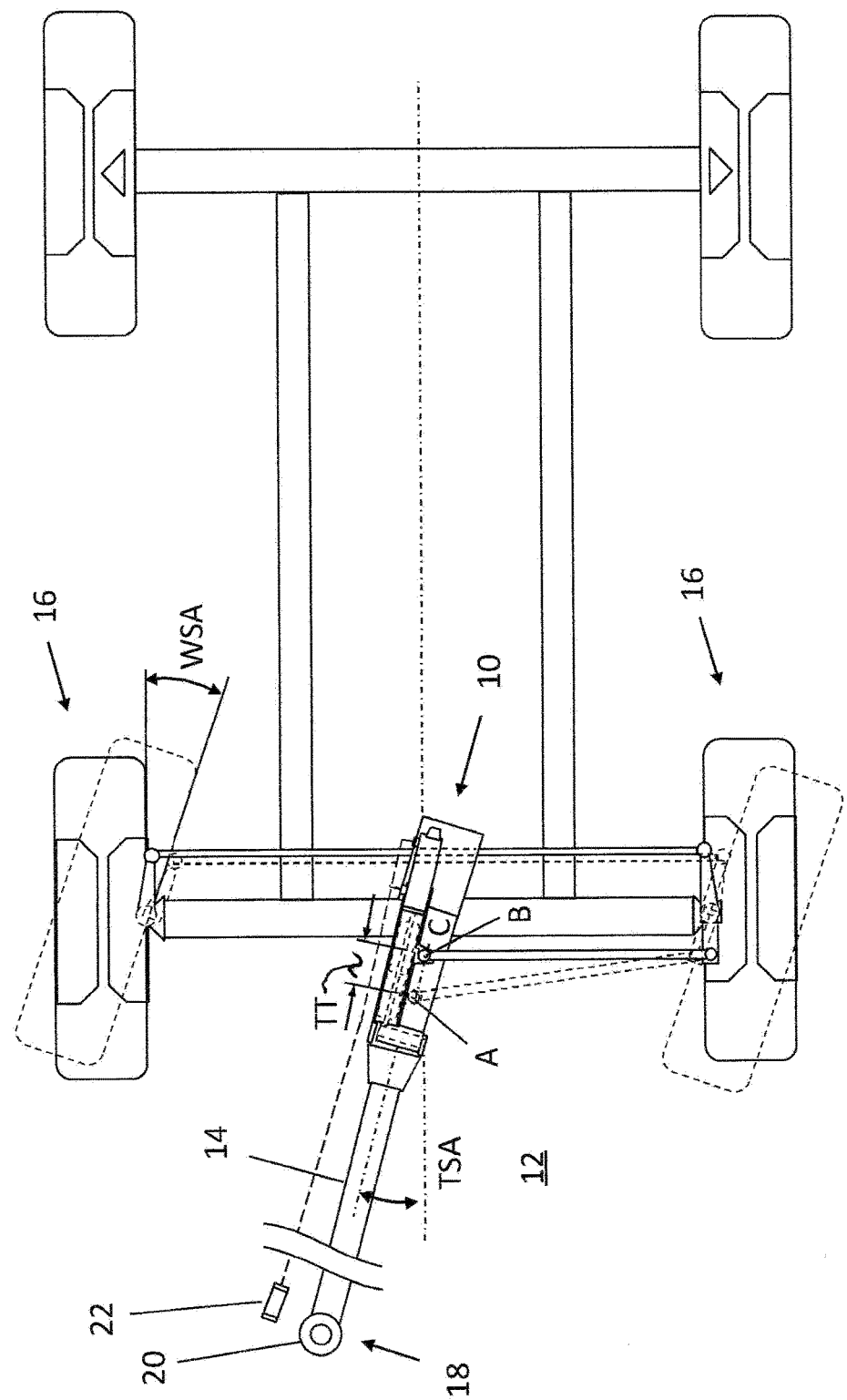
FIG. 1 is a diagrammatic top view of construction details of one embodiment of the invention.

Referring to FIG. 1, trailer steering system 10 is shown at a towed end 12 of a trailer or the like, and which includes a drawbar 14 and steered wheels 16 having a steering angle WSA controlled according to the tow bar angle TSA. In this system, drawbar 14 is provided at end 18 with a conventional hitch connector 20 adapted to fit any conventional vehicle hitch. Hydraulic and electrical connectors are represented at 22. As such, no modifications whatsoever are needed to the vehicle or hitch thereon, and any vehicle having a hitch can be connected to and tow Applicant's trailer.

Figure 2:
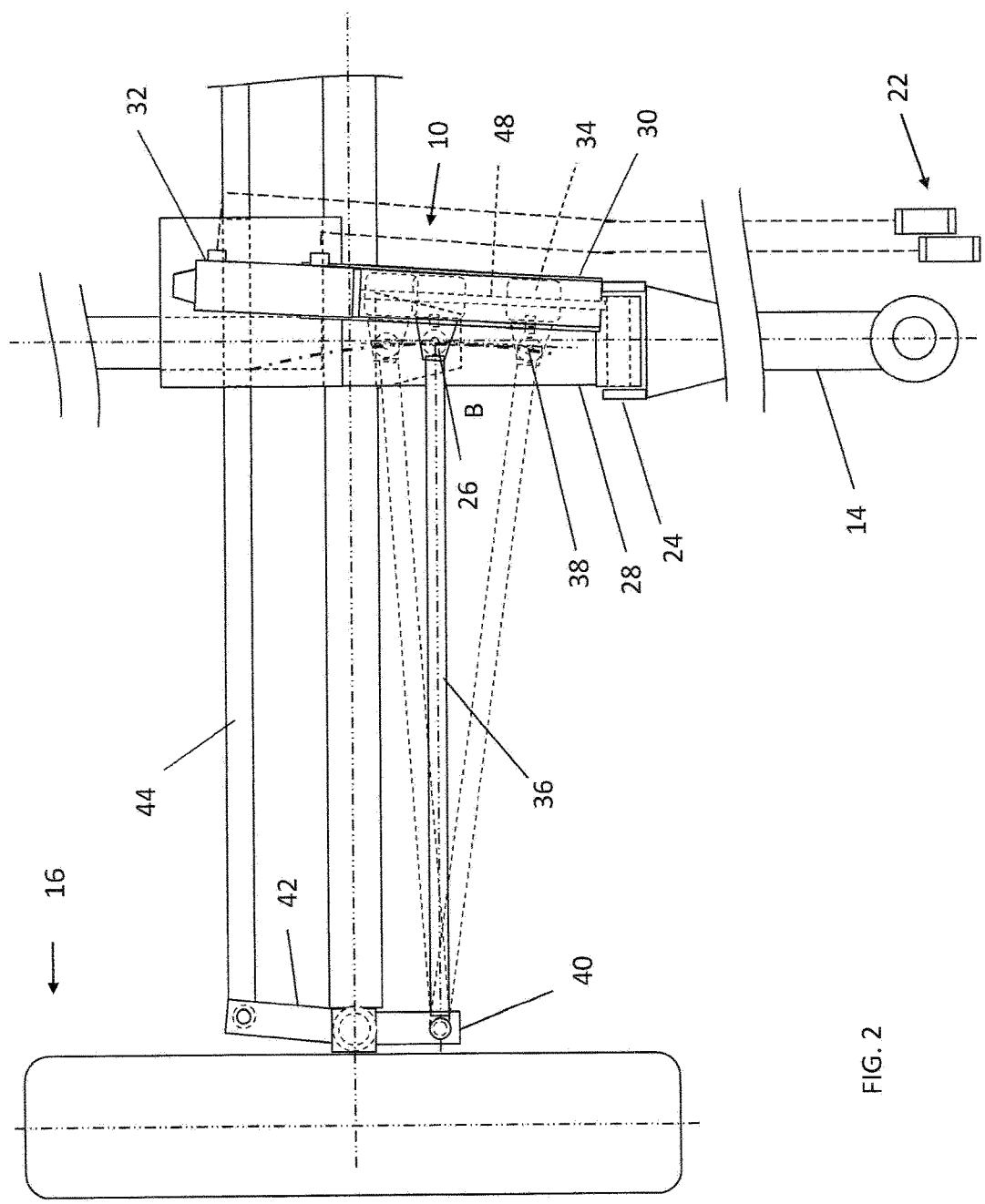
FIG. 2 is an enlarged partial view showing details of a steering mechanism of the embodiment of FIG. 1.

FIG. 2 shows a proximal end of the trailer of FIG. 1, with drawbar 14 connected to the trailer at a pivot axis 24 about which the drawbar pivots vertically, and a second pivot axis 26 about which drawbar 14 pivots from side-to-side as the trailer is towed or backed. Drawbar 14 may be configured separately, i.e. as a conventional drawbar as shown, or configured integrally with a turntable or turntable-like arrangement 28, as described in Applicant's incorporated patent. Also rigidly connected to drawbar 14 or to turntable 28, and oriented approximately parallel to drawbar 14 in this embodiment, is steering system 10 (FIG. 1) comprising a slide 30 that supports a hydraulic actuator or the like 32 that moves carriage 34 (dashed lines) between each end of slide 30 according to operator or computer inputs on the tow vehicle or tractor. A steering control rod 36 is attached at one end to carriage 34, as by a conventional steering knuckle joint 38 (dashed lines), with the slide and associated knuckle joint generally positioned by the operator, or possibly by an automatic control, at one of a towing position A (dashed lines of rod 36) wherein wheels 16 of the trailer are steered generally in the same direction as angular displacement of towbar 14, a backing position C (dashed lines of rod 36) wherein front wheels 16 are turned opposite to sideways towbar displacement, and a center position B wherein front wheels 16 are maintained parallel to the rear, fixed wheels, irrespective of towbar displacement. Significantly, position B decouples angular towbar displacement TSA from steering angle WSA of the wheels of the trailer. This occurs because knuckle joint 38 that attaches steering rod 36 to carriage 34, when in position B, is vertically aligned with pivot axis 26, resulting in no movement of rod 36 when the drawbar is moved from side-to-side. Conversely, when knuckle joint 38 is moved by carriage 34 on slide 30 to position A, i.e. forward of pivot axis 26, sideways angular displacement of drawbar 14 to one side or the other results in corresponding movement of steering rod 36 bearing on steering arms 40, 42, both being fixed to the steered master wheel 16, with a tie rod 44 rotatably attached to steering arm 42 on wheel 16. The opposite end of tie rod 44 is conventionally attached to a corresponding steering arm on the opposite front wheel, for steering the opposite front wheel. With this construction, and with knuckle joint 38 of rod 36 at position B, towbar displacement is decoupled from steering so that the trailer can be backed in a straight direction irrespective of towbar displacement. With steering knuckle 38 at position C, the trailer may be steered while backing, or when at any position between positions B and C, the trailer may be steered while backing with varying steering sensitivity. When being towed, steering knuckle 38 is placed at position A, which steers the trailer proportionally with towbar displacement to cause the wheels to accurately track with the tow vehicle. Positions A, B and C may be the only positions to which steering knuckle 38 is moved, or as noted, steering sensitivity while backing may be adjusted by positioning the steering knuckle anywhere between positions B and C.

Figure 3:
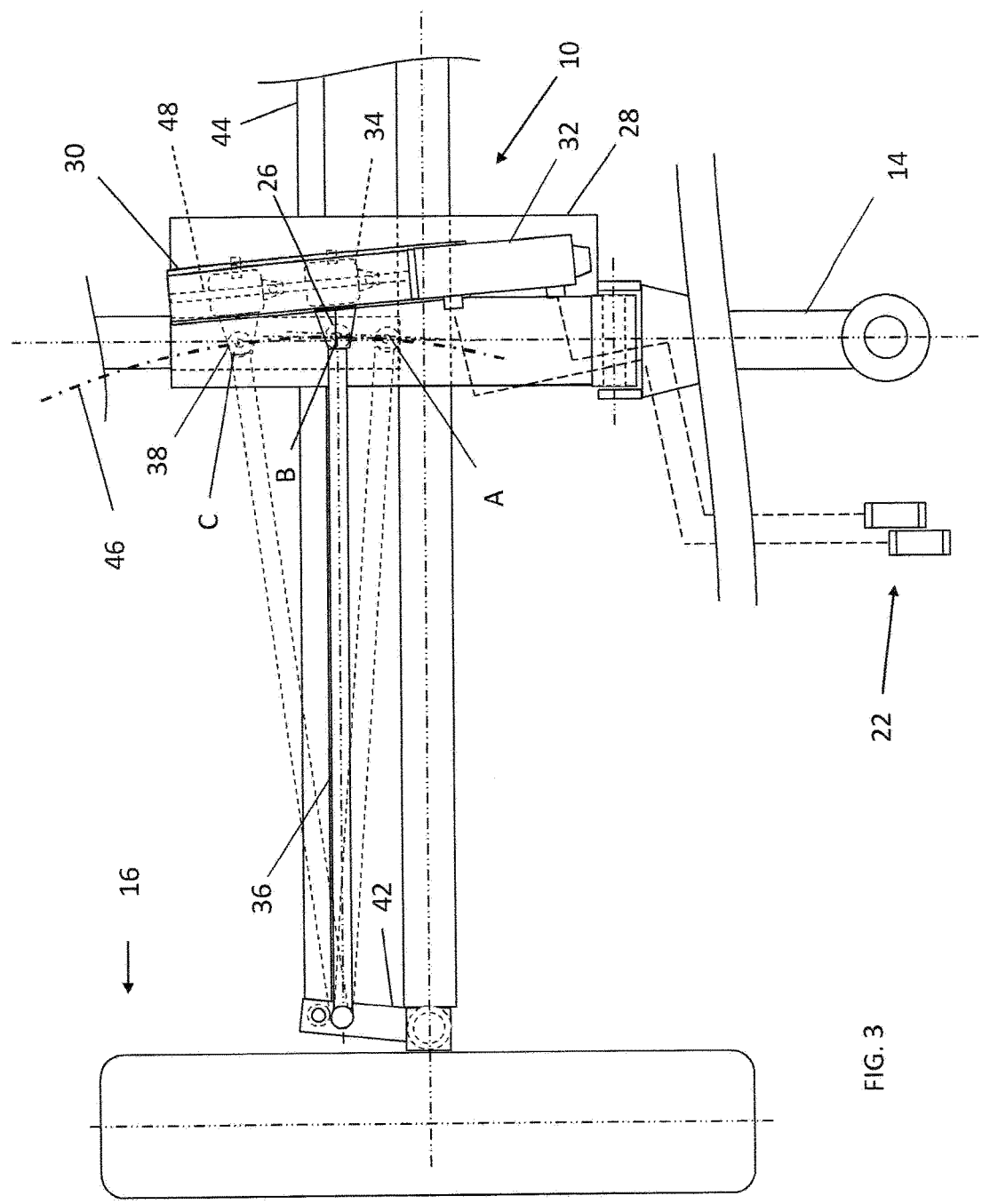
FIG. 3 is an enlarged partial view showing details of another steering mechanism of the invention.

Other embodiments of the steering system may comprise, and as noted, a hydraulic actuator mounted to slide 30 that moves carriage 34 between points A and C. Arc 46 (FIG. 3) is defined by pivot attachment of rod 36 to steering arm 42 when both wheel and tow bar are aligned parallel to the rear fixed wheels. Significantly, and as shown in FIG. 3, slide 30 is not mounted parallel to drawbar 14, but rather is slightly angled, perhaps by 2-4 degrees or so, so that when knuckle joint 38 attached to carriage 34 is at one of points A, B and C along arc 46, steered wheels 16 are parallel with towbar 12. When located at point A, the towing position, the steered wheels 26 track accurately with towbar displacement, with little to no scrubbing of the wheels during turning. With knuckle joint 23 located at point B, which is coincident with axis 26 about which the towbar and slide pivots, steered wheels 16 will always be in a straight ahead position regardless of towbar displacement. When knuckle joint 38 is positioned at point C, the maximum steering angle WSA (FIG. 1) is obtained with towbar displacement. Any point between points B and C may be selected according to the desired amount of steering WSA with respect to tow bar angle TSA when backing. As such, responsiveness of trailer steering when backing may be varied by varying position of carriage 34 between points B and C. When carriage 34 is closer to pivot axis 26, less steering occurs for a given degree of towbar displacement. With carriage 34 positioned closer to point C, more steering occurs for the same given degree of towbar displacement. In general, and as noted, towing position A will always be a position in which steering of the trailer wheels will vary proportionally and to a similar or the same extent to towbar displacement, and accurately track with steering of the tow vehicle. Significantly, FIG. 2 also shows that the backing position C is displaced closer to axis 26 than the towing position A. As a result, the embodiment of FIG. 2 has a reduced or attenuated effect on backing due to horizontal towbar displacement TSA effecting less wheel steering WSA as compared to towbar displacement when towing. If more steering angle WSA is desired during backing, position C may be moved further rearward away from pivot axis 26.

In yet other embodiments, a lead screw or hydraulic shaft 48 that moves carriage 34 may be manually operated, at least in a backing mode, as by an electrical rocker switch or hydraulic control lever or the like, that is easily accessible by the driver or operator of the tow vehicle, so that carriage 34 could be positioned anywhere between points B and C along arc 46 during backing. As noted, this would allow the operator to vary wheel steering angle WSA amplification or attenuation, defined as the extent of steering in relation to towbar displacement, during backing according to position of carriage 34 along slide 30.

In one embodiment of steering system 10, actuator 32 may be a dual acting hydraulic cylinder for moving carriage 34 along slide 30, and which receives pressurized hydraulic fluid from the tractor hydraulic power supply, represented by connectors 22 and operated by an operator using existing manual levers on the tractor. Where the carriage is manually operated, as by a hand-crank used to turn the lead screw, optical indices may be provided that indicate when the drawbar or turntable are aligned at position C or at selected positions between B and C. Here, one or more openings in slide 30 may be registered with an opening in carriage 34, and a pin inserted through the respective aligned openings to lock the carriage in place at the selected position or location on the slide. This would relieve steering forces on a lead screw or hydraulic cylinder and prevent backdriving of the leadscrew, or prevent premature failure of seals on a hydraulic cylinder. Other embodiments may use a battery and electric motor to turn a lead screw operatively attached to carriage 34 in order to move carriage 34 between towing or backing modes. Limit or proximity switches may be used to stop carriage 34 at the extreme positions A and C. in some embodiments, a manually operated remote controller, operated remotely by an operator, or a relay switch energized by a battery and reverse signal from the tow vehicle to automatically switch between forward and reverse settings may be used so the tow vehicle operator does not need to egress the tow vehicle to change between forward or reverse settings or to adjust a reverse setting.

FIG. 3 is an embodiment steering system 11 where pivot axis B is located behind the front axle of the trailer, eliminating the need for a front control arm 40 (FIG. 2) at the front steered wheels. Steering rods 36 and 44 must be attached to control arm 42 of wheel 16 in vertically spaced relation to maintain vertical spacing of tie rod 44 during operation, as by mounting the knuckle joint of control rod 36 to the upper side of control arm 42 and the knuckle joint of control rod 44 to the lower side of control arm 42.

Figure 4:
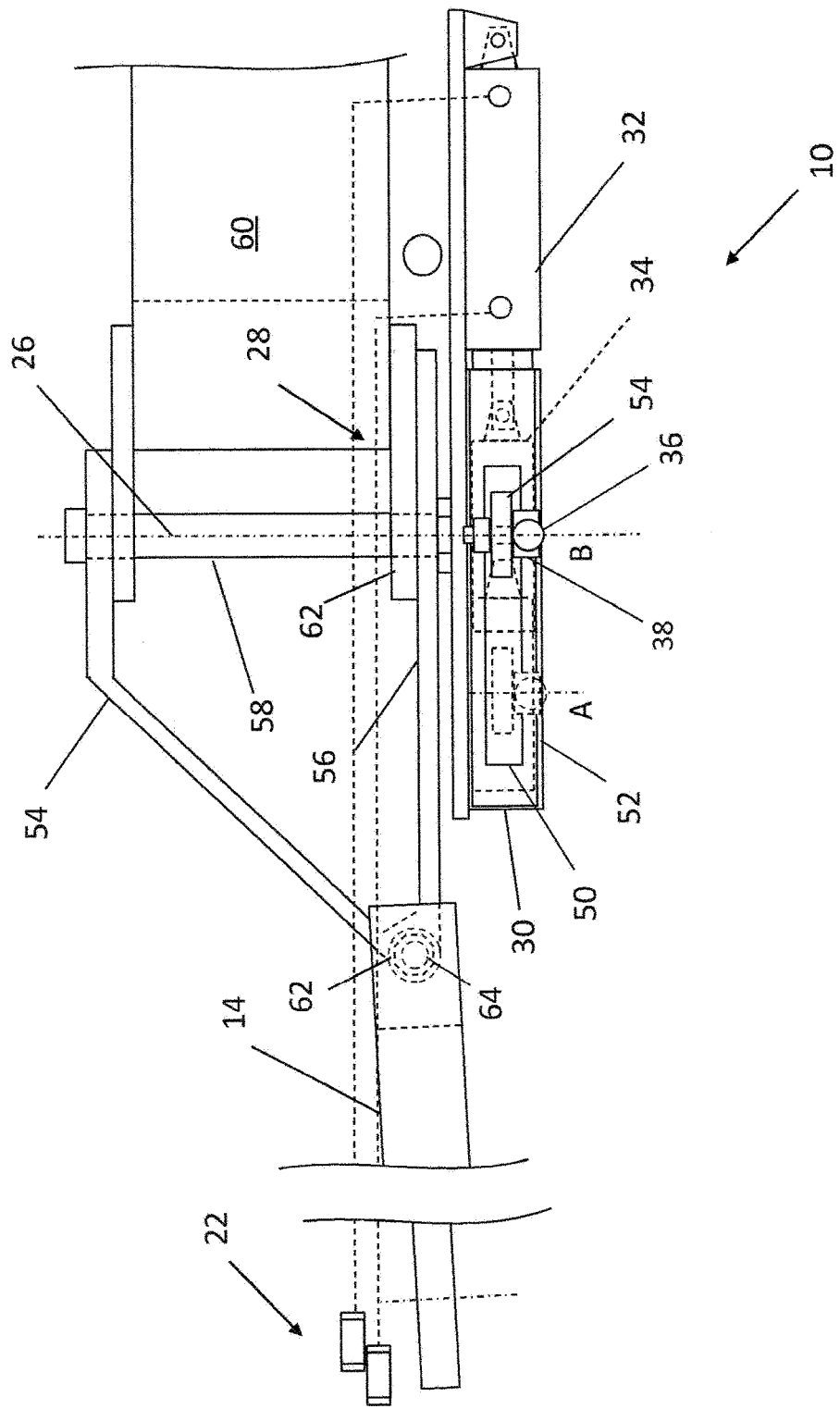
FIG. 4 is a side view of a steering mechanism of the invention.

FIG. 4 shows a view of steering system 10 as seen from the side of the turntable assembly 28 and along steering rod 36 with carriage 34 shown at position B (solid lines) and A (dashed lines). A slot 50 extends generally the length of outer tubing 52 that forms slide 30, and through which protrudes a stub shaft or the like 54 to which steering knuckle 38 is attached to carriage 34. As shown, carriage 34 may be configured as a section of metal block that slidably fits into tubing 52, with channeled walls to react steering loads. Dissimilar metals or high density plastic may be used as a bearing material between carriage 34 and slide 30, or where they are of a sufficiently tight sliding fit, a grease may be used as lubricant. Turntable 28 may be generally configured including a D-shaped bracket formed by an upper leg 54 and a lower leg 56, and which are rotatably attached to a connecting member 58, which may be a bolt, tube, axle or the like, which in turn is connected to frame member 60 of the wagon. Alternately, upper and lower legs 54 and 56 may be connected to member 60, with members 54, 56 rotatably supported by frame 60 about a pivot axis 26. In any case, legs 54, 56 are supported in rotating relation to member 60 about axis 26. One or more rotatable bearings or load bearing surface 62 are provided between frame member 60 and turntable 28. Connecting member 58 terminates as shown above steering knuckle 38 so that steering knuckle 38 is movable from one side of axis 26 to the other side of axis 26, in this instance from front to back and vice versa, just under turntable 28.

Upper and lower legs 54, 56 of turntable 28 may be angled to intersect at load member 62, which may be a horizontal round tube, attached, as by welding, to upper and lower legs 54, 56. A connecting member, such as a pin 64, is inserted through openings in drawbar 14 and tube 62, so that drawbar 14 is attached to legs 54, 56 and in turn to turntable 28, or directly to turntable 28 in vertically pivotable relation. With this construction, the drawbar is free to pivot vertically about pin 64, and free to pivot in horizontal directions about axis 26 along with the lower half of turntable 28 and slide 30 in turn pivotally attached as described to drawbar 14. As shown, hydraulic actuator 32 and slide 30 are supported by lower leg 56, so that as drawbar 14 is displaced horizontally, lower leg 56, slide 30 and carriage 34 rotate about axis 26. Significantly, the center of attachment of steering knuckle 36 on stub member 54 on carriage 34 is longitudinally aligned to axis 26 (position B) so that wheels 16 of the trailer (FIG. 1) are oriented for backing straight along the long axis of the trailer irrespective of angular displacement of the towbar. As such, the trailer can be towed into position as desired by putting carriage 34 at position A, and, and then backed straight backwards along the long axis of the trailer by putting the carriage at position B, where angular horizontal displacement errors of the towbar having little to no effect on the straight backing of the trailer.

Figure 5:
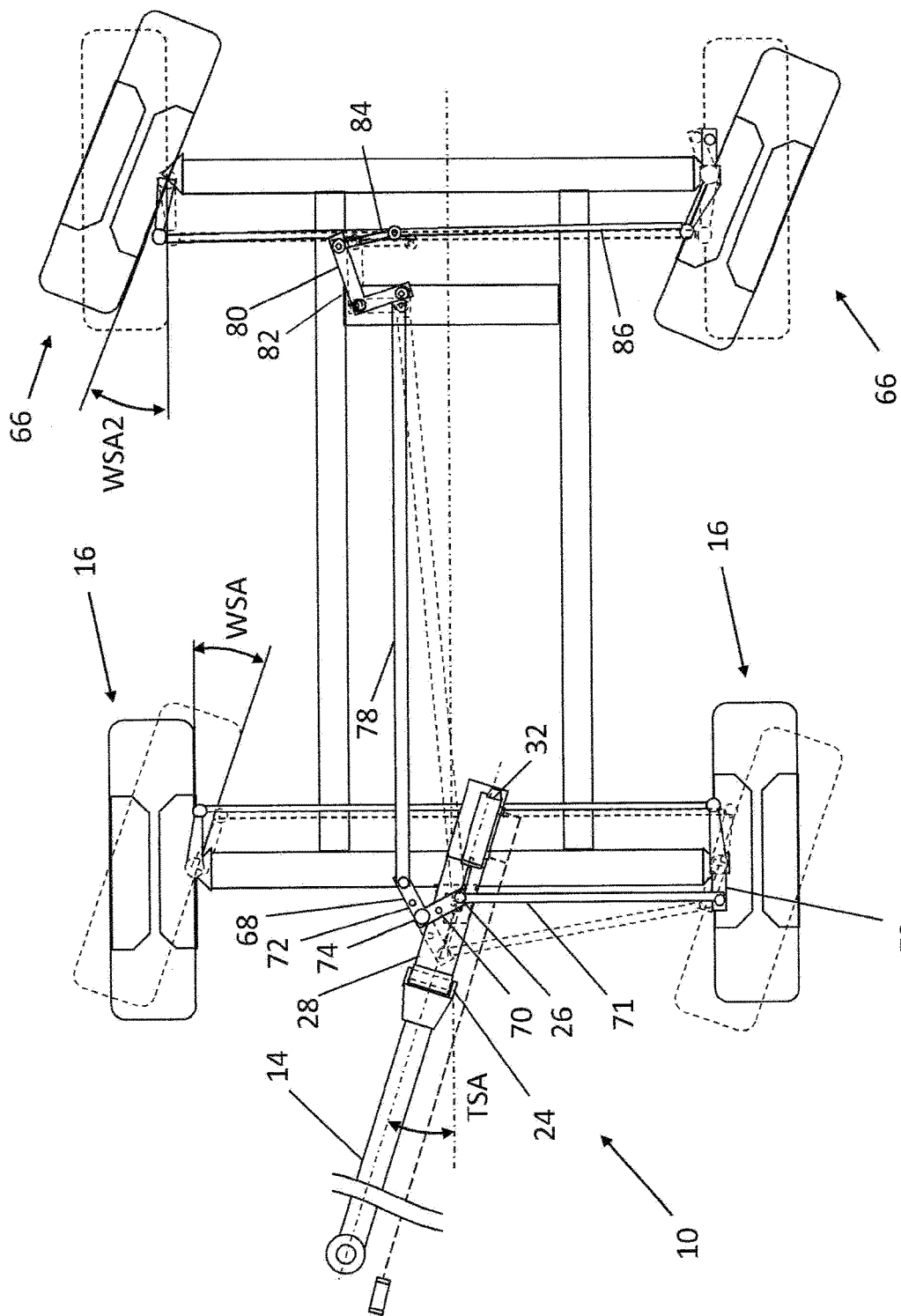
FIG. 5 is a bottom diagrammatic view of another embodiment of the invention top diagrammatic view of another embodiment of the invention.

FIG. 5 shows a bottom view of a steering system embodiment 10 that steers front wheels 16 of the front axle when towing and rear wheels 66 of the rear axle when backing. When towing (dashed line position), towbar steering angle TSA is coupled to wheel steering angle WSA of front steered wheels, moving them in the same direction and same extent as towbar displacement while maintaining the rear wheels straight irrespective of towbar displacement. When backing, towbar steering angle TSA is decoupled from WSA at the front and coupled to the angle WSA2 of rear steered wheels 66, which then are steered in the same direction, but not necessarily to the same extent, as towbar 14 displacement. In this embodiment, towbar 14 connects with turntable 28, which rotates about pivot 26 as shown in FIG. 4, and according to horizontal displacement of the drawbar. Bell crank 68 and associated attachment legs 70, 72 pivot about an axis 74, which is offset from axis 26, mounted to the side of turntable 30. An end of one leg 70 of bellcrank 68 is connected to a steering knuckle mounted to the carriage as described earlier, and to connecting rod 71 attached at the other end to wheel 16. As more clearly seen in FIG. 6, actuator rod 48 of linear actuator 32 is also attached to leg 70 of bellcrank 68 in order to move bellcrank 68 between a towing position and a backing position. The other leg 72 of bellcrank 68 is connected via a connecting rod 78 to a rear bellcrank 80, which steers the rear wheels when backing when bellcrank 68 is in the solid line position as shown. With this construction, when bellcrank 68 is moved by rod 4 of actuator 32 to the solid line position, the steering knuckle on bellcrank arm 70 is over pivot axis 26 so that the front wheels 16 are maintained in a straight orientation (solid lines) with towbar displacement and not steered at all. Horizontal displacement of the towbar then moves leg 72 of the bellcrank, in turn pulling or pushing on control rod 78, which in turn steers the rear wheels via bellcrank 80 in the same direction as towbar displacement.

For towing the embodiment of FIG. 5, bellcrank 68 is moved by rod 48 to the dashed line position with the connection point for steering knuckle on leg 72 positioned over pivot axis 26. This maintains rear wheels 66 in a straight ahead position regardless of towbar displacement. The connection point, or steering knuckle 26, is likewise moved to be forward of pivot axis 26 (dashed lines) so that towbar displacement causes front wheels 26 to be steered in the same direction as towbar displacement. As noted above and in Applicant's incorporations, the bellcrank may be moved by hand, as by a hand crank, or a linear actuator operated electrically, hydraulically or pneumatically.

Figure 6:
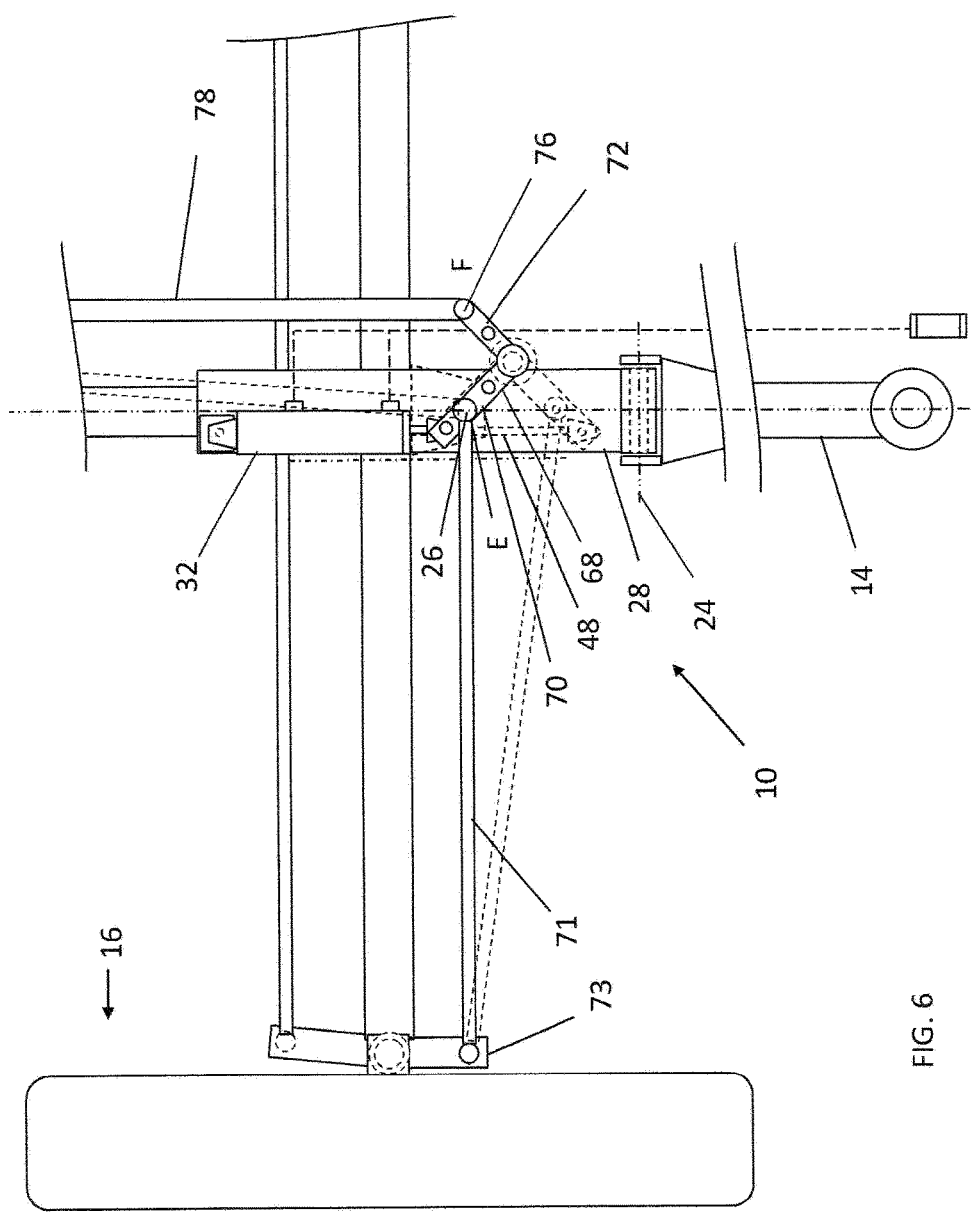
FIG. 6 is an enlarged partial view showing details of the steering mechanism of FIG. 5.

Still referring to the steering system embodiment 10 of FIG. 5, FIG. 6 shows one attachment leg 70 of bell crank 68 rotatably attached to a conventional steering knuckle joint at one end of connector rod 71, with the other end of rod 71 connected via a conventional steering knuckle to control arm 73, which steers front wheels 16. Another attachment leg 72 of bell crank 68 is attached at its end to connector rod 78 via a conventional steering knuckle joint 76, which steers rear wheels 66 (FIG. 5) through bell crank 82. With this configuration, and when backing, the steering knuckle attached to leg 70 is maintained over axis 26 when towbar 12 is displaced sideways, thus keeping the front wheels in a straight-ahead position, while leg 72 of bellcrank 68 operates to move rod 78 to steer the rear wheels in the direction of sideways towbar displacement. When backing, the forward wheels 16 are fixed parallel to the trailer chassis independent of tow bar angle TSA because the steering joint attached to bellcrank arm 70 is over axis 26. However, the offset provided by bellcrank 68 causes arm 72 connected to rod 78 to move forwards and backwards with respective sideways towbar displacement. A locking pin that locks the bellcrank in place may be employed between bell crank 68 and turntable 30 generally around an opening E in the bellcrank and respective openings in turntable 28 to positively lock the bellcrank in its selected position and prevent relative motion between bell crank 68 and turntable 28 during towing or backing operations.

Figure 7:
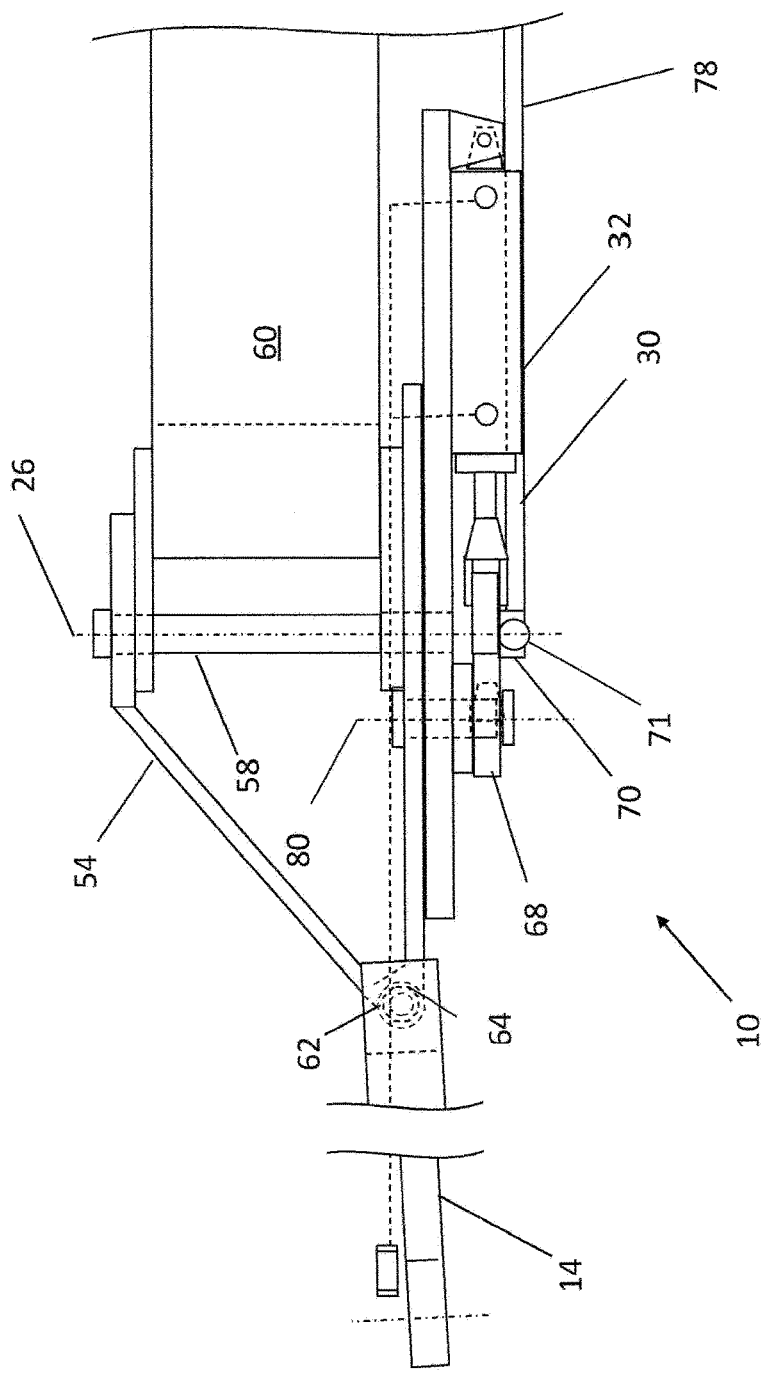
FIG. 7 is a side view of the steering mechanism of FIG. 6.

FIG. 7 shows the vertical clearance of steering rods of steering system 10 and shaft 80 of bell crank 68 relative to the trailer chassis 60. In other disclosed embodiments, a carriage and slide form the steering mechanism that selectively steers the front and rear wheels, but in this embodiment bellcranks are employed to selectively steer the front and rear wheels. Significantly, one key point here and in other embodiments is that the positioning of ends of the control rods 71 and 78 with respect to axis 26 determines which wheels are steered, and in some embodiments, the extent of steering with respect to sideways towbar displacement when backing. Another key point is that turntable 28 rotates with towbar movement about axis 26 to facilitate moving ends of control rods 71 and 78, thus steering or maintaining position of the respective wheels.

Figure 8:
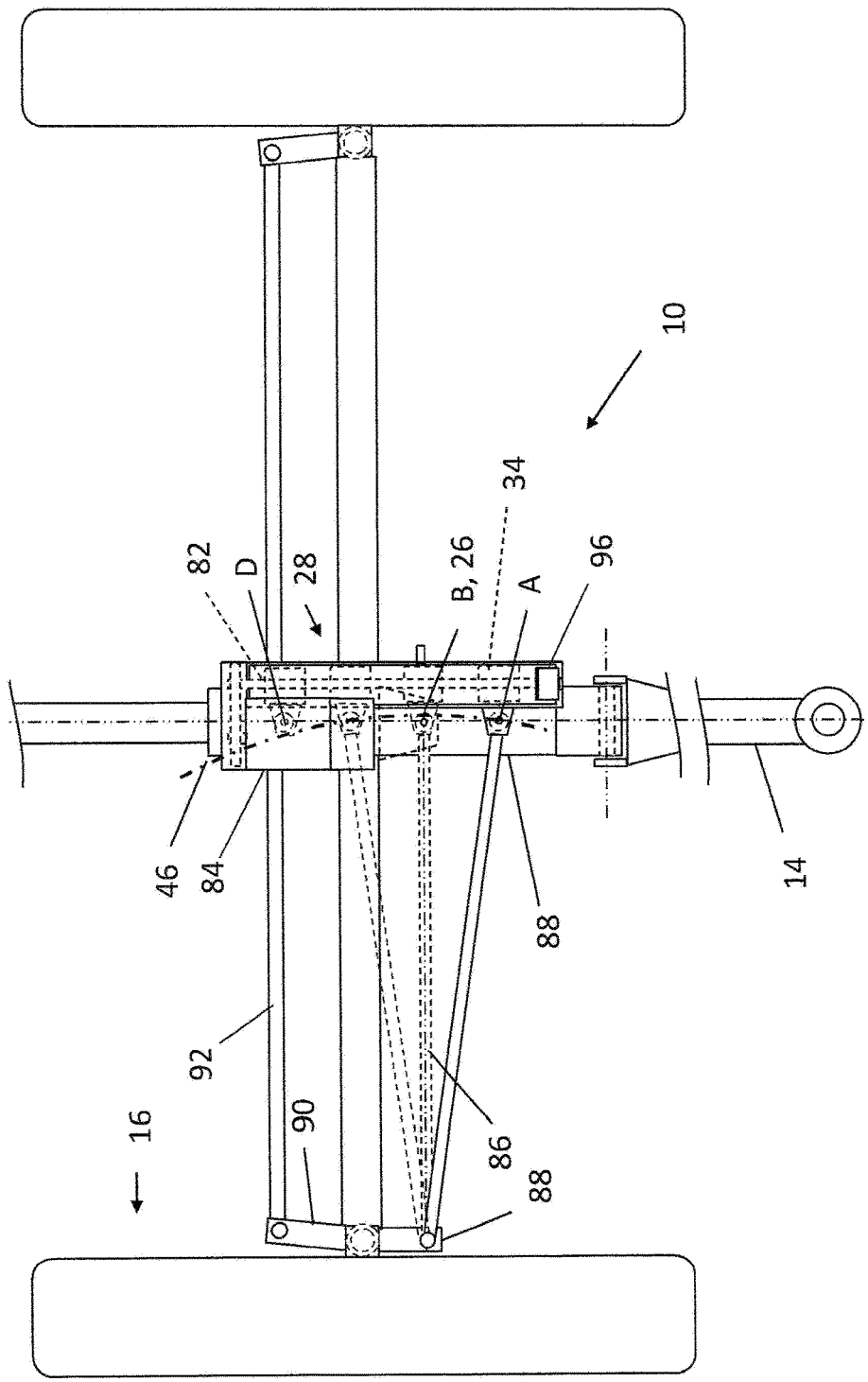
FIG. 8 is a top view of another embodiment of the invention.

FIG. 8 shows an automatic control embodiment 10 with tow bar 14 attached to turntable 28 in vertically movable relation about pivot axis 26, with the turntable and attached towbar both pivoting about pivot axis 26. A slide 30 rigidly attached to turntable 28 is configured as a straight slide, with a lead screw 82 rotatably mounted at one end of slide 30 and at the other end powered by a motor or the like 84, as disclosed in Applicant's incorporated patent. Other ways of moving the slide may be an electric, hydraulic or pneumatic linear actuator. In this embodiment, carriage 34 within slide 30 is attached to a control arm 86 by a stub shaft, bracket or the like 88 extending from the side of or through a slot in a side of slide 30. As such, slide 30 is offset from axis 26 about which the turntable pivots. Activating motor or the like 84 translates carriage 34 along slide 30 to any position, such as positions A, B or C, and any other intermediate position, with position A used when towing and approximately at position C when backing. Position B decouples towbar displacement from steering, allowing the trailer to be backed straight regardless of sideways towbar displacement. As before, carriage 34 supports a steering knuckle connected to connector rod 86, in turn attached with a steering knuckle to steering arm 88 at wheel 16. A second steering arm 90 fixed to wheel 16 in turn connected by a steering knuckle to tie rod 92, which connects by a steering knuckle to the opposite steered wheel 16 according to an Ackerman or parallel steering relationship.

Here, position A is the same distance as position C from axis 26 about which turntable 28 rotates. Notably, position A and position B fall on curve 46, whereas point C may be slightly offset from curve 46, which induces a slight steering bias of wheels 16. When carriage 34 is at either position A or B, when tow bar 12 is straight forward, wheels 16 are straight forward, while when carriage 30 is at positions C and D, wheels 16 are turned slightly from a straight ahead position. Such error is believed to be insignificant, as position C is only used when backing, which is a slow operation that does not involve significant distances that would create any significant tire wear as compared to towing (position A) where steering needs to be accurate in order to prevent any tire wear due to tracking error. As such, in the embodiment 10 of FIG. 8, with position A representing a towing configuration, a 1:1 relationship exists between angular drawbar displacement TSA and turning displacement WSA of the front steered wheels 16. When backing, position C represents a 1:1 relationship that exists between angular drawbar displacement TSA and turning displacement WSA of the front steered wheels. In other words, when towing, 5 degrees of towbar displacement results in 5 degrees of turning of the front wheels in the same direction as the towbar, and when backing, 5 degrees of tow bar displacement results in 5 degrees of steering of the front wheels in the opposite direction. In some embodiments, carriage 30 may be driven to a position D beyond C, where the wheels are steered to a greater extent with respect to the towbar steering angle. Here, when backing, and by way of example, 5 degrees of towbar displacement may result in 10 degrees of turning of the steered wheels in the opposite direction. Such an embodiment may be used in conjunction with a steering or counter-steering automatic or semi-automatic control algorithm that may be GPS controlled or facilitated, or a steering system using a PID (proportional-integral-derivative) control scheme when backing. In these embodiments, the slide may be moved automatically, or manually by the operator watching an indicator, with on-the-fly backing adjustment to adjust extent of steering.

Figure 9:
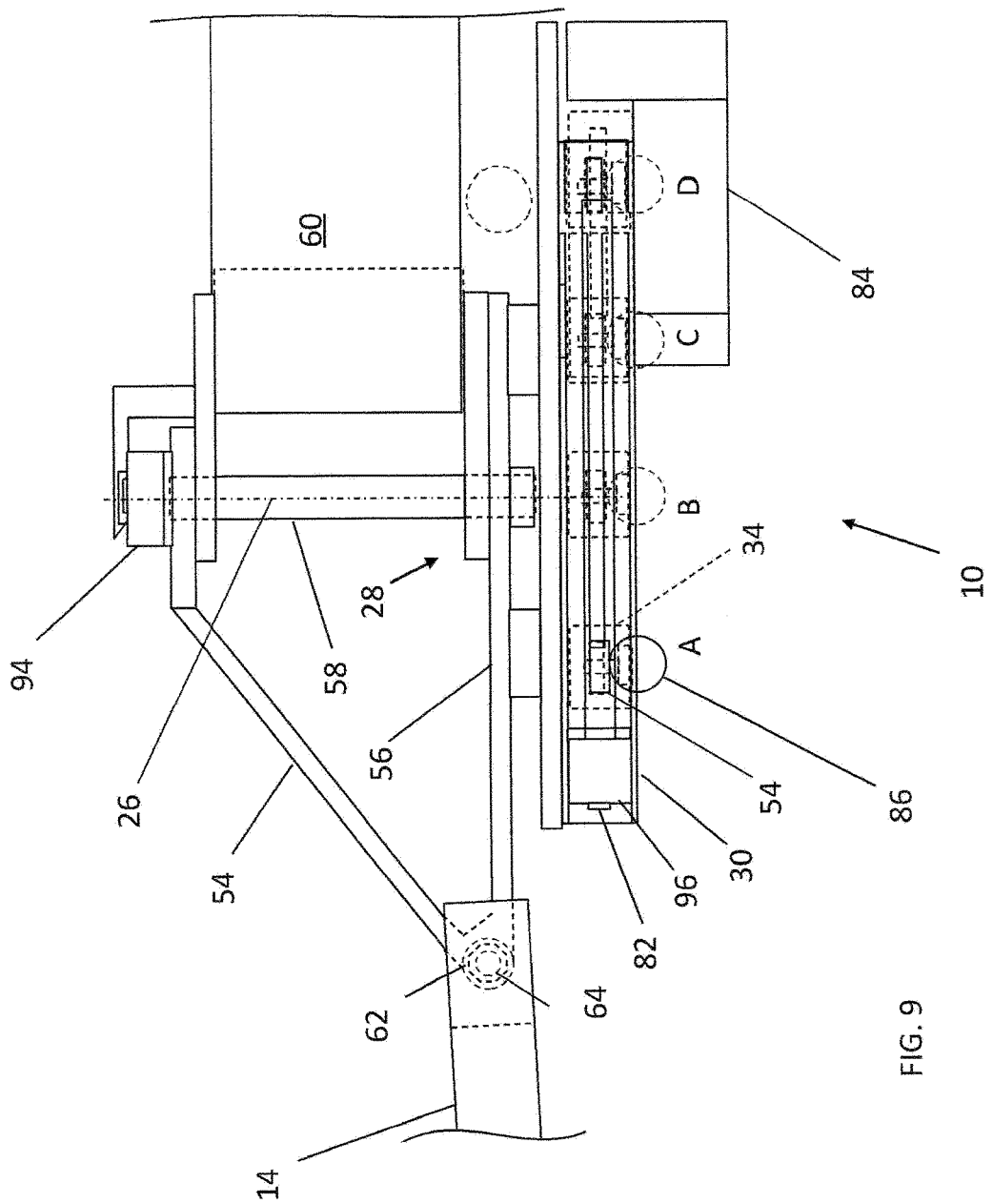
FIG. 9 is a partial side view of the steering mechanism of FIG. 8.

To implement such an automatic or semi-automatic control scheme, FIG. 9 shows a side view of the embodiment of FIG. 8, with a towbar angle sensor 94 connected between trailer frame 60 and turntable 28. Sensor 94 measures towbar angle TSA relative to the longitudinal axis of the trailer chassis, or the turntable angle about pivot axis 26 relative to the longitudinal axis of the trailer chassis. A second sensor 96 may be connected to lead screw 82, and counts the number of turns of the lead screw as an indicator of carriage 30 location. Sensors 94, 96 are connected or coupled to a microprocessor which is used to control carriage 34 movement during backing according to a preprogrammed software algorithm.

Referring back to FIGS. 1 and 2, by defining TT as the distance between pivot axis 26 and the attachment of the end of control rod 86 to carriage 34 along slide 30, positive towards position A and negative towards position C. The steering gain G, or the ratio WSA/TSA, is determined as the quotient of TT by the length of the steering arm at the wheel (pivot axis to pivot axis) according to the formula $$G=TT/\text{Length}_{(Steering\ Arm)}$$

Figure 10:
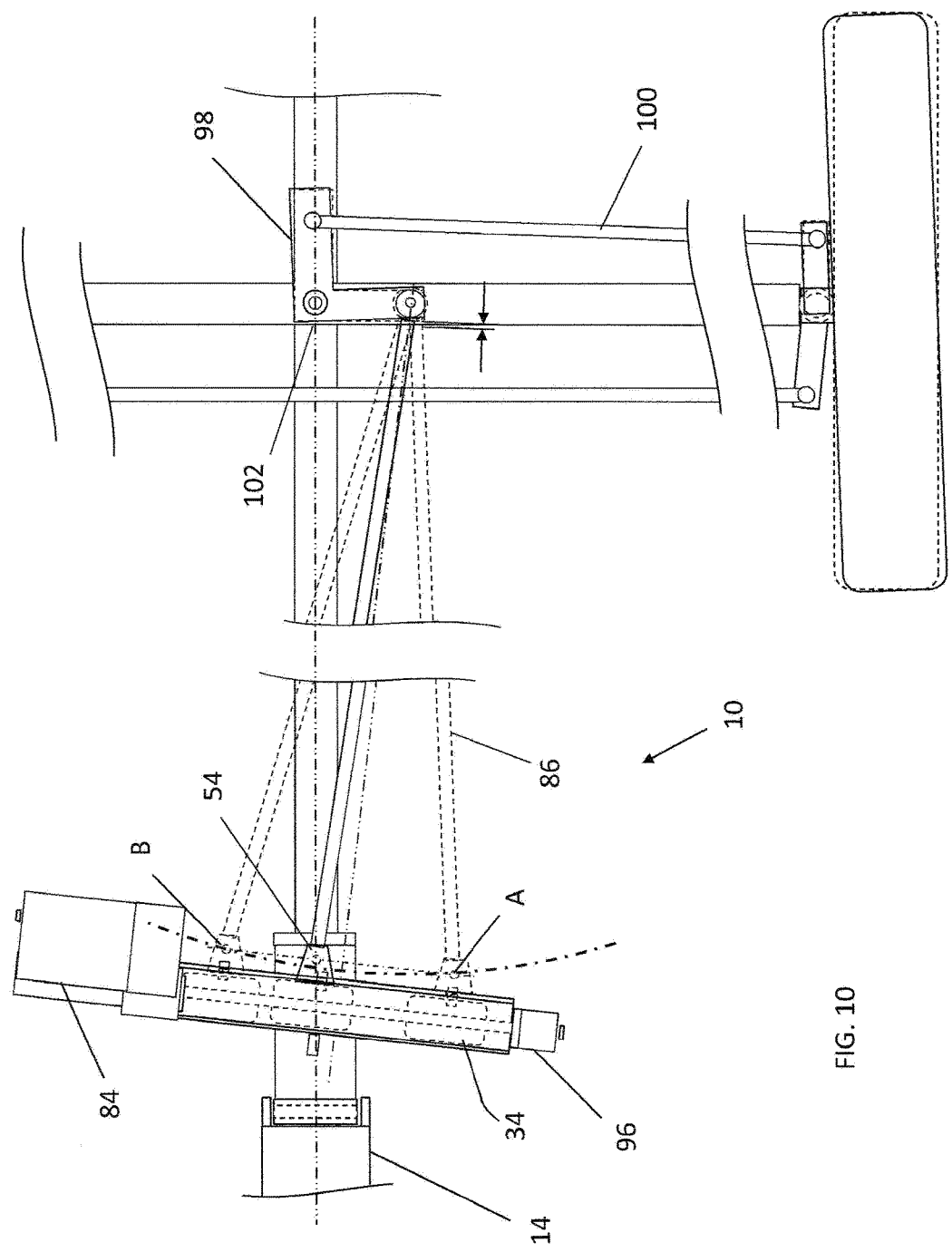
FIG. 10 is a top diagrammatic view of another embodiment of the invention.

If there is a bell crank for steering the rear wheels as shown in the embodiment of FIG. 10, G is further developed as the product of the ratio of the length of the input leg of the bell crank with attachment to rod 86 over the length of the output leg 98 of the bell crank with attachment to rod 100. If both legs of bell crank 102 are of equal length, steering gain may then be manually or automatically adjusted or modulated on-the-fly by varying TT to achieve a desired steering relationship according to the equation $$WSA=TSA*TT/\text{Length}_{(Steering\ Arm)}$$

Where WSA is wheel steering angle and TSA is towbar steering angle.

Sensor 94, such as a shaft absolute encoder, which may be an optical digital encoder or the like, may be used to detect towbar angle, TSA, for automatic backing. A microprocessor is used in conjunction with limit or proximity sensors between carriage 34 and slide 30, and encoder 94, to automatically give carriage 34 commands when backing to move associated steering mechanism to steer wheels 16 according to preprogrammed steering control algorithm programmed into the microprocessor. Significantly, if electricity is cut during operation, the trailer steering linkage will work safely and remain in its current operational mode.

Figure 11:
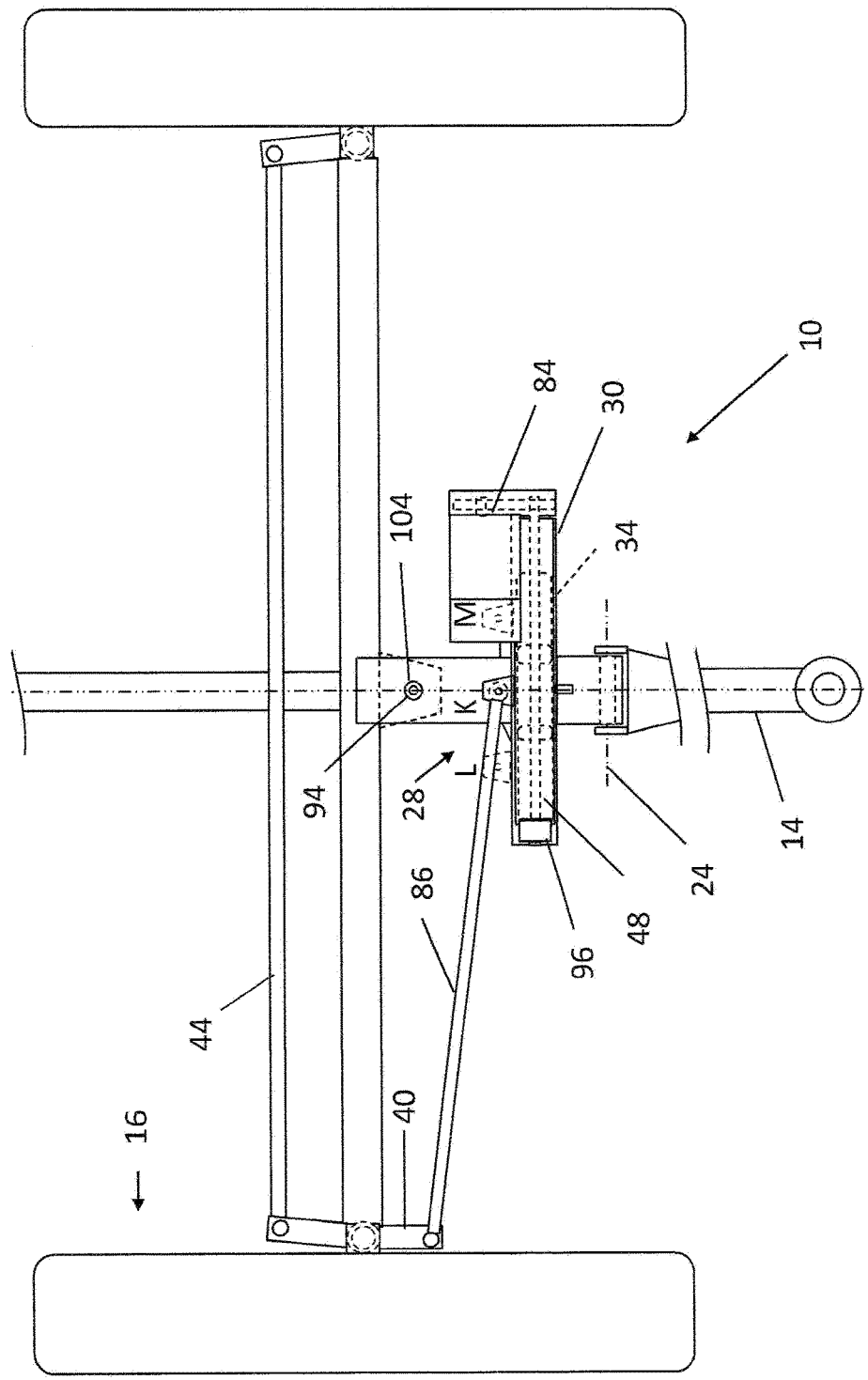
FIG. 11 is a top diagrammatic view of another embodiment of the invention.

FIG. 11 shows an embodiment where tow bar 14 connects to turntable 28, in turn mounted to vertical pivot 104, which allows horizontal pivoting of the turntable. Slide 30 is mounted to the underside of turntable 28, and is offset forward from pivot axis 104. A second, horizontally oriented pivot 24 forward of turntable 28 allows vertical pivoting of tow bar 14. Control rod 86 is pivotably connected at a distal end thereof through a steering knuckle to steering arm 40 fixed to steered wheel 16, in turn attached via steering rod 44 to the steering arm of opposite steered wheel 16 according to an Ackerman or parallel steering arrangement. When towing, carriage 34 is maintained at center position K wherein steered wheels 16 are pivoted in the same direction and proportional to towbar 14 displacement by utilizing a braking motor or a locking pin to fix carriage 34 at position K. When backing, sensors 94 and 96 provide inputs to a microprocessor that commands motor 84 to turn lead screw 48 in order to position carriage 34 according to a preprogrammed control algorithm based on sensor input and towbar angle.

In this embodiment, and when in a backing mode, motor 84 turns leadscrew 48, which moves carriage 34 and the associated attachment steering knuckle and proximal end of control rod 86 directly towards and away from wheel steering arm 40. An algorithm in a computer process, or a control, such as a joystick operated by the operator of the tow vehicle or the like, may be used to position the steering knuckle between the center point K, which is used for towing, and points L and M in order to adjust sensitivity of steering relative to towbar displacement. Here, when the steering knuckle is at position K, steering angles when backing is the same as towbar angles when towing, i.e. 10 degrees of towbar displacement results in 10 degrees of steering of the steered wheels. During backing, when the steering knuckle is moved toward positions L or M, the same given towbar displacement of 10 degrees may result in more or less steering of the steered wheels depending on the direction the carriage is moved. As such, it should be apparent that adjustments may be made on-the-fly when backing in order to accurately position a trailer.

Referring back to embodiment 10 in FIGS. 8 and 9, it is shown that when using a straight slide 30 across pivot 26, positions C and D are slightly to the inside of arc 124 and it therefore displaces wheels 16 slightly, inducing a steering error or bias away from straight forward, as earlier described. To eliminate this bias, slide 30 and corresponding carriage 34 is provided with a motor 84 that turns a leadscrew 82 that drives carriage 34 back and forth across the length of slide 30. Carriage 34 is connected via a control rod 86 to steered wheels 16, also as earlier described, according to commands from a microprocessor developed through an algorithm incorporating inputs from sensors 94, 96. In this embodiment, the proximal end of control rod 86 is continuously varied along curve 46 with corresponding varying degrees of towbar displacement to maintain the steering knuckle at the end of control rod 86 along curve 46. The motion along curve 46 when towbar 14 is not centered, with corresponding non-zero value of the towbar steering angle, TSA, may cause carriage 34 to provide a controlled response to the wheel steering angle WSA. Such a controlled response may occur when the carriage is moved to positions near C or D, and are known in advance to cause the steering knuckle to deviate from the optimum curve 46. As such, when the carriage is driven toward points C and D, as detected by encoder 96 (FIG. 9) that would deviate the steering knuckle from curve 46, the microprocessor provides control signals to motor 84 that rotate the leadscrew a corresponding number of turns, or fractions thereof, to move the carriage and steering knuckle slightly along the slide so as to follow curve 46. In other embodiments, such as in FIGS. 12 and 13, and as will be further explained, curved grooves matching a curve 124 (FIG. 12) may be machined within top and bottom interior sides of a straight, generally tubular slide, with a carriage configured to allow a steering knuckle mounted to the carriage to engage the curved grooves and move laterally within the carriage, following the curved groove. As such, any need for programming to reduce or eliminate tracking error due to a straight slide is eliminated.

In some embodiments, motor 84 (FIG. 8) may be a stepping motor, so that sensor 96 may not be needed, with the requirement being that the microprocessor would count the number of steps of motor 84 and associate such counts with towbar angles of displacement, such as by a lookup table stored in memory. In other words, any given towbar angle results in a retrieved number of counts from the lookup table that drives motor 84 to maintain the steering knuckle along curve 46, resulting in accurate tracking during backing of trailer steering with steering of the tow vehicle. Updates of the steering angles could occur at any frequency to accommodate the fastest anticipated changes in steering angles, which may be as slow as 120 updates per second or even less. The stepping motor may be selected where each step corresponds to 10 degrees of rotation, or 36 steps for each rotation. Where the pitch of the lead screw is 4 turns per inch, such an arrangement would result in an accuracy of positioning steering knuckle 23 of $144^{th}$ of an inch for each step of stepping motor 84. In other embodiments, an analog motor may be used, for instance a servo-type motor, or an analog motor used in conjunction with sensor 96 in order to count the number of revolutions or fractions thereof to accurately determine position of the carriage on the slide.

Other embodiments include a sensor measuring angle HSA, hitch steering angle (FIG. 12), between the tow vehicle center axis and towbar 12, providing additional information to microprocessor M further improving capability of control algorithms used during backing operations. Of course, also as noted above, the leadscrew may be driven in any manner to increase or decrease steering response of the steered wheels responsive to sideways towbar displacement.

Figure 12:
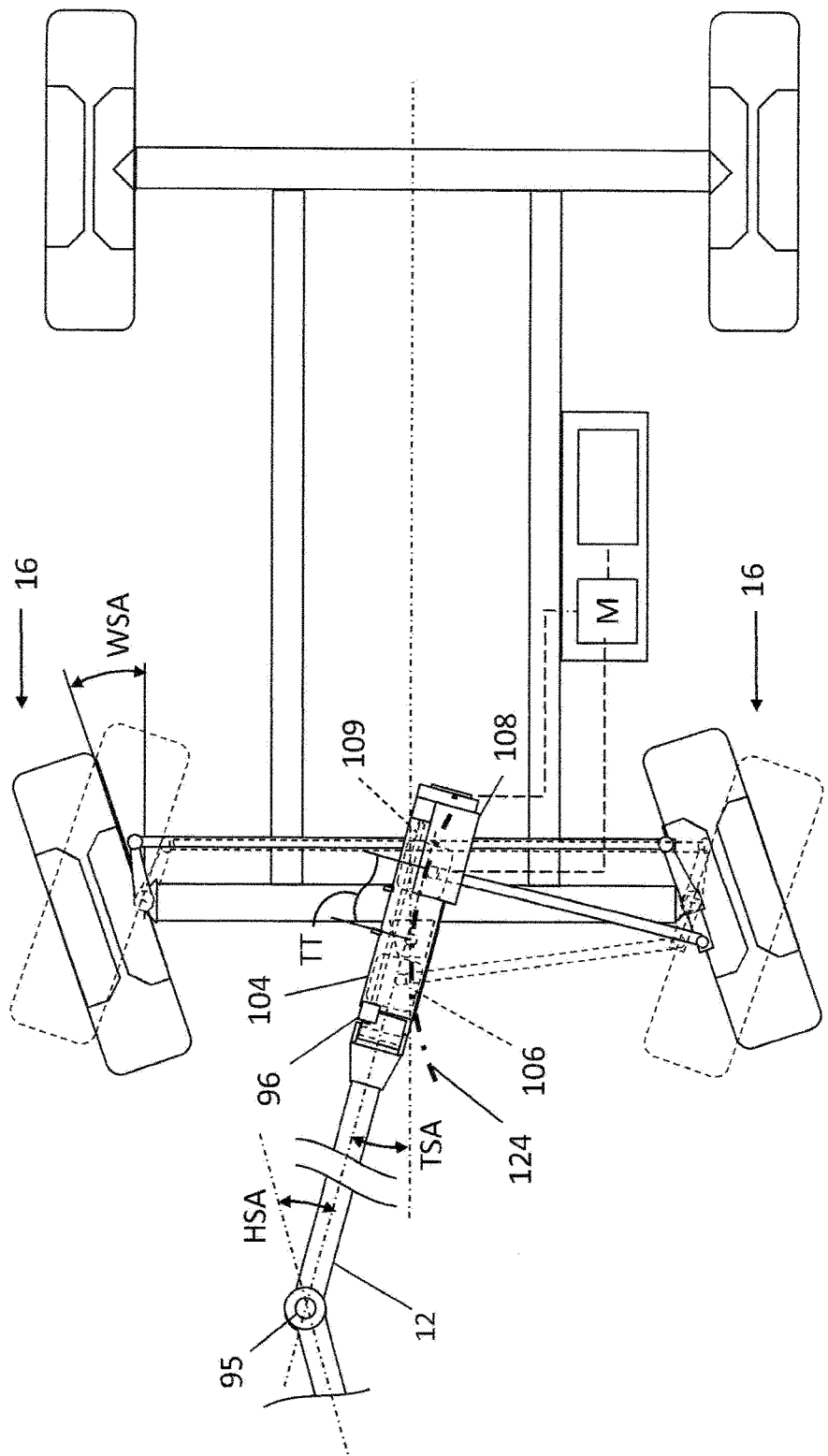
FIG. 12 is a top diagrammatic view of another embodiment of the invention.

FIG. 12 shows an embodiment whereby proximal end of control rod 110 is maintained at position C when backing (FIG. 8) and moved by motor 108 and leadscrew 109 according to microprocessor M commands in the opposite direction (rearward of the turntable pivot axis) with respect to displacement of the towbar responsive to sensor 94 measuring TSA and sensor 96 measuring turns of leadscrew 121 to implement a preprogrammed algorithm. One such algorithm moves a carriage 106 in an equal and opposite direction of towbar displacement, maintaining wheels 16 parallel to rear fixed wheels.

FIGS. 12-15 show embodiments with slides that implement a curve of the steering knuckle and associated attachment point for an end of a control rod attached to the steering knuckle, and a continuously adjustable carriage. From an operator standpoint, these embodiments function the same as embodiments of FIGS. 1 and 8 but with two distinct advantages. First, position C on embodiments of FIGS. 12-15 does not have an inherent steering bias as does a slide configured to move a carriage in a straight line as in the embodiments of FIGS. 1 and 5, and second, when moving the carriage between positions B and position D, there is symmetry between carriage function with left and right backing and improved controllability in the steering mechanism.

Figure 13:
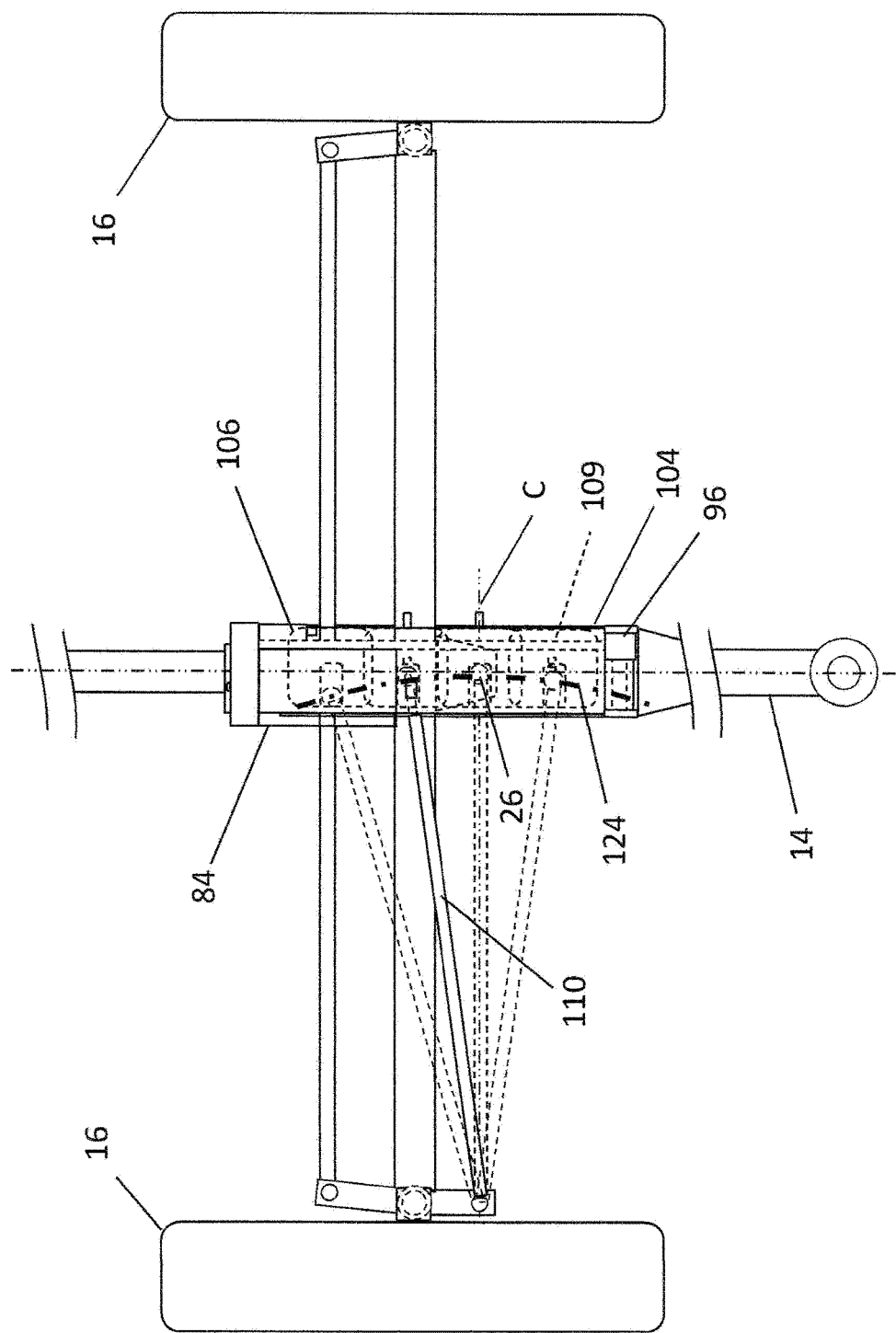
FIG. 13 is a top diagrammatic View of another embodiment of the invention.

Referring to FIG. 13, carriage 106 may include a slotted attachment to a steering knuckle attached to rod 110, and comprising a follower mating attachment to slide 104, the steering knuckle moving in or out of carriage 106 as leadscrew 109 turns to move carriage 106 along curved slots in slide 104. In this embodiment, when the leadscrew is rotated, carriage 106 is moved along a curved path 124 having a radius such that at any point of travel of carriage 106 and the associated steering knuckle is maintained along path 124. This eliminates the described steering bias that otherwise would result with the steering knuckle attached to the carriage being forced to take a straight path that deviates from curve 124, as described with respect to FIG. 8. Moreover, slide 104 is positioned such that when towbar 14 is centered, the steering knuckle and proximal end of steering rod 110 are approximately vertically aligned with pivot axis 26, and curvature 124 of slide 104 maintains wheels 16 centered as the steering knuckle and carriage 106 are moved along the curved slot in slide 104.

Figure 14:
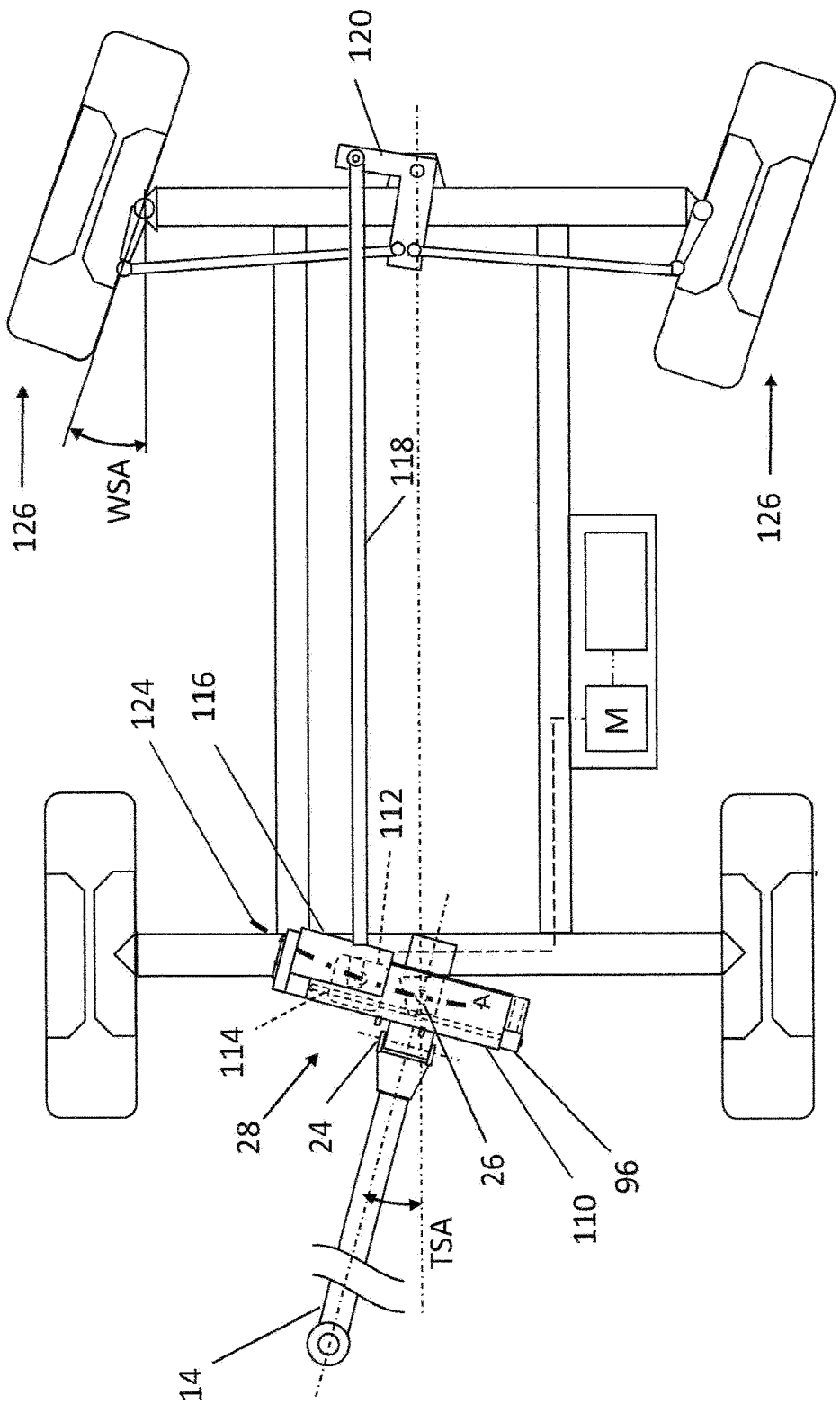
FIG. 14 is a top diagrammatic view of another embodiment of the invention.

FIG. 14 shows an embodiment comprising towbar 14 pivotally attached to a turntable 28 at horizontal pivot 24, allowing vertical displacement of the distal end of towbar 14, with turntable 28 rotatably mounted to vertical pivot 26 for allowing sideways displacement of towbar 14. A slide 110 is mounted approximately perpendicular to towbar 14, with a respective carriage 112 driven by a leadscrew 114 and motor 116 as described above. As with the embodiment of FIG. 13, carriage 112 is configured to move its attached steering knuckle along curve 124, with the proximal end of rod 118 moving in and out of carriage 110 to follow curve 124, which as noted is a curve defined by the length of rod 118 and a curved slot in slide 110. A distal end of control rod 118 attaches to one leg of bell crank 120 by a steering knuckle. With this construction, rear wheels 126 are steered according to towbar displacement, and may be in conjunction with commands from microprocessor M running an algorithm using inputs from sensors 94, 96 (e.g. FIG. 11) along with operator commands for forward and reverse. In a simpler embodiment, steering sensitivity may be controlled by the operator using a manual control, which as noted may be a joystick or the like, that directly operates and controls position of the carriage to vary sensitivity of steering when backing.

Figure 15:
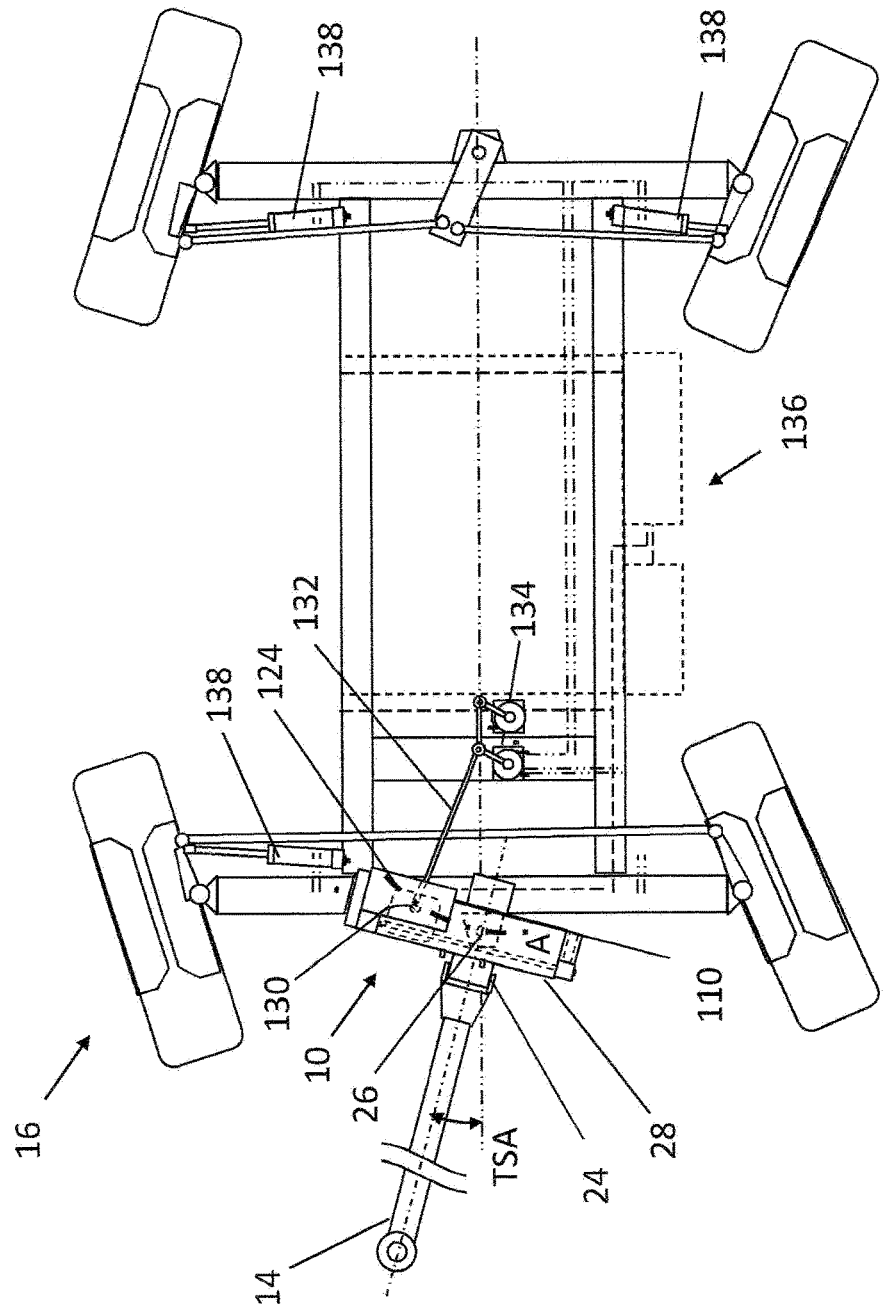
FIG. 15 is a top diagrammatic view of another embodiment of the invention.

FIG. 15 is an illustration of an embodiment comprising towbar 14 attached with horizontal pivot axis 24 to turntable 28 that rotates about a vertical pivot 26 so towbar 14 can move up and down and side to side. A slide 110 is attached to the underside of turntable 28, and which serves to move the proximal end 130 of steering control rod 132 along curve 124 as described above. In this embodiment, steering rod 132 is coupled to hydraulic power steering units 134 that may include a steering valve, a hydraulic pump and reservoir 136 (dashed lines), which may be mounted to the trailer or to a tractor, with appropriate plumbing as would be apparent to one of average skill in the art. In varying embodiments, front wheels 16 may be steered, the rear wheels may be steered, or both front and rear wheels may be steered. Double acting hydraulic cylinders 138 may be used to steer respective steered wheels, with spool valves or the like operated by steering rod 132. In one version of this embodiment, the trailer would be configured as a "mule" to move and reposition road trailers pulled by semi tractors around a trailer yard, and be configured so as to accommodate a tractor hitch and ancillary components, which may include, in various embodiments, electric or fuel powered motors coupled to one or more wheel axles for powering or power-assisting the mule, a hydraulic pump and associated motor for powering the steering, an air compressor for releasing and activating trailer brakes on the trailer and in a hybrid embodiment, a combustion engine, battery and battery charger. Advantages of this type of mule is that a small vehicle, such as a small tractor, small car or the like, could be connected to the towbar of the mule with a conventional hitch and be used to move semi trailers and containers on dollies around a trailer yard. In accordance with the severe operating conditions of such an embodiment, the mule would be of ruggedized construction.

Figure 17:
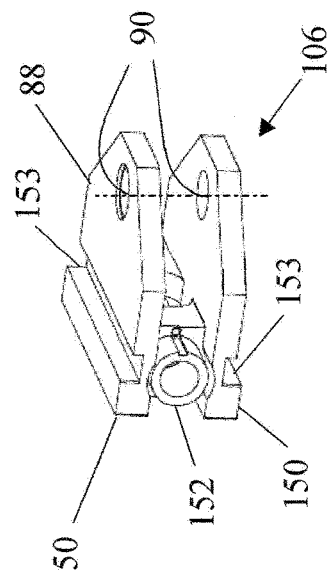
FIG. 17 is an isometric view of the carriage of FIG. 16.
Figure 16:
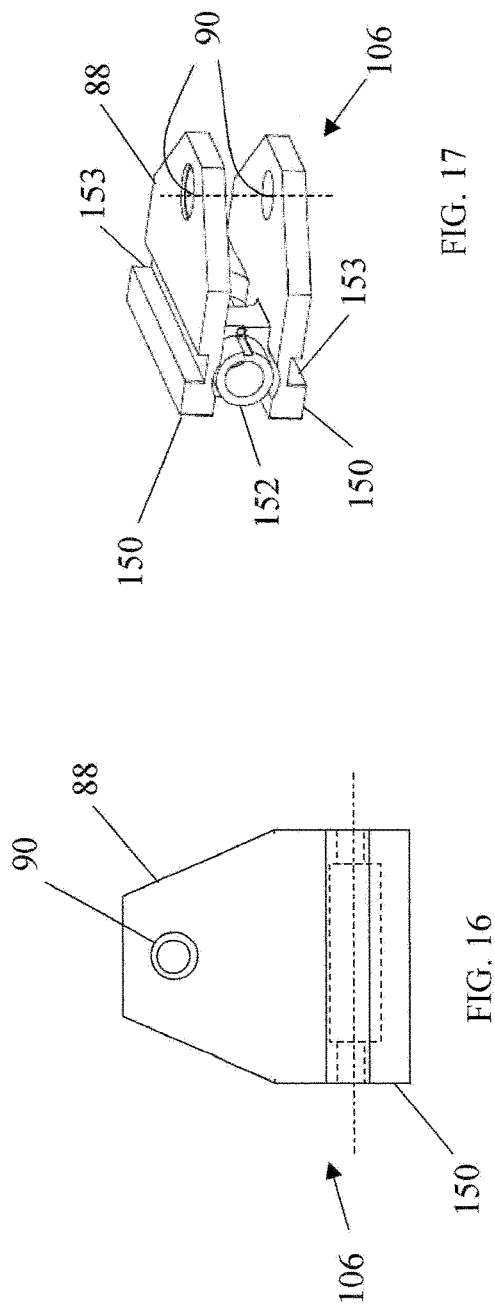
FIG. 16 is a top view of one carriage of the invention.

FIGS. 16 and 17 show construction details of a carriage 106 that may be used in embodiments using a straight track. In this embodiment of a carriage, a boss 150 is provided at one end of the carriage, which engage respective grooves or slots in interior sides of slide 19 to react steering loads and guide the carriage as it is moved by the leadscrew. In addition, the interior sides of a slide may be provided with bosses or ridges extending the length thereof, and which engage grooves 153 of carriage 106. Stub end 88 (also shown in FIG. 8) is provided with a openings 90 into which a steering knuckle is attached to the various control rods of the invention. A nut 152 is mounted as shown generally between bosses 150, and threadably engages the leadscrew, which when rotated moves carriage 106 within slide 30. In some embodiments, high density plastic bearings may be mounted on the exterior sides of carriage 106 or interior sides of slide 30, while in other embodiments carriage 106 is closely fitted to the interior of slide 30, with grease used as lubrication between the carriage and slide. In some embodiments, end plates or covers may be provided at each end of the carriage, and which are slotted to allow passage therethrough of the leadscrew. The slots may be provided with flexible seals in order to provide some protection from dirt, rocks, water and other adverse environmental conditions, although it is anticipated that the slide, motor and leadscrew be provided with an environmentally tight housing for protection.

Figure 18:
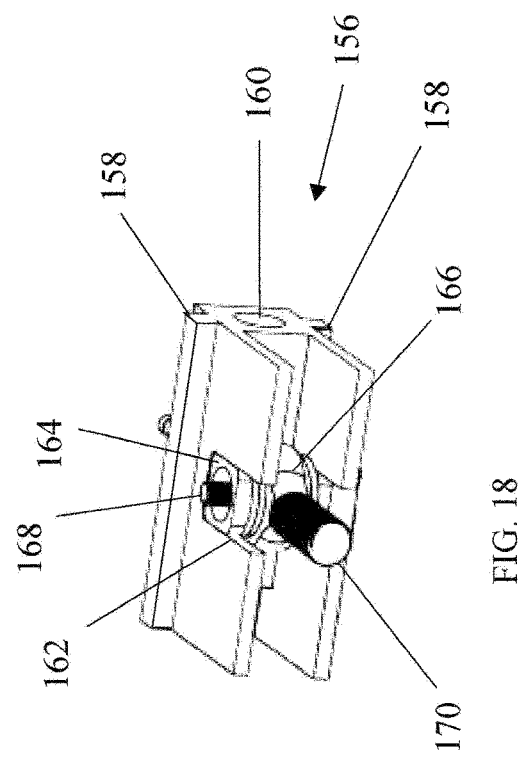
FIG. 18 is an isometric view of another carriage of the invention.

FIG. 18 shows a carriage 156 similarly comprising upwardly and downwardly extending bosses 158 that engage grooves in interior sides of a straight slide. A threaded opening 160 engages the leadscrew. A generally square cutout is provided in tops and bottoms of the carriage, with corresponding square portions 164 of a sliding stub 166 fitting into the cutouts 162. As such, stub 166 is generally free to move in directions perpendicular to carriage 156. However, a shaft, boss or the like 168 extends on upper and lower sides of stub 166, and fits into corresponding curved grooves in interior top and bottom sides of slides 104 so that a steering knuckle attached to threaded shaft 170 is made to follow the curved grooves, and thus curve 124 for accurate tracking of the wheels as earlier described.

Figure 19:
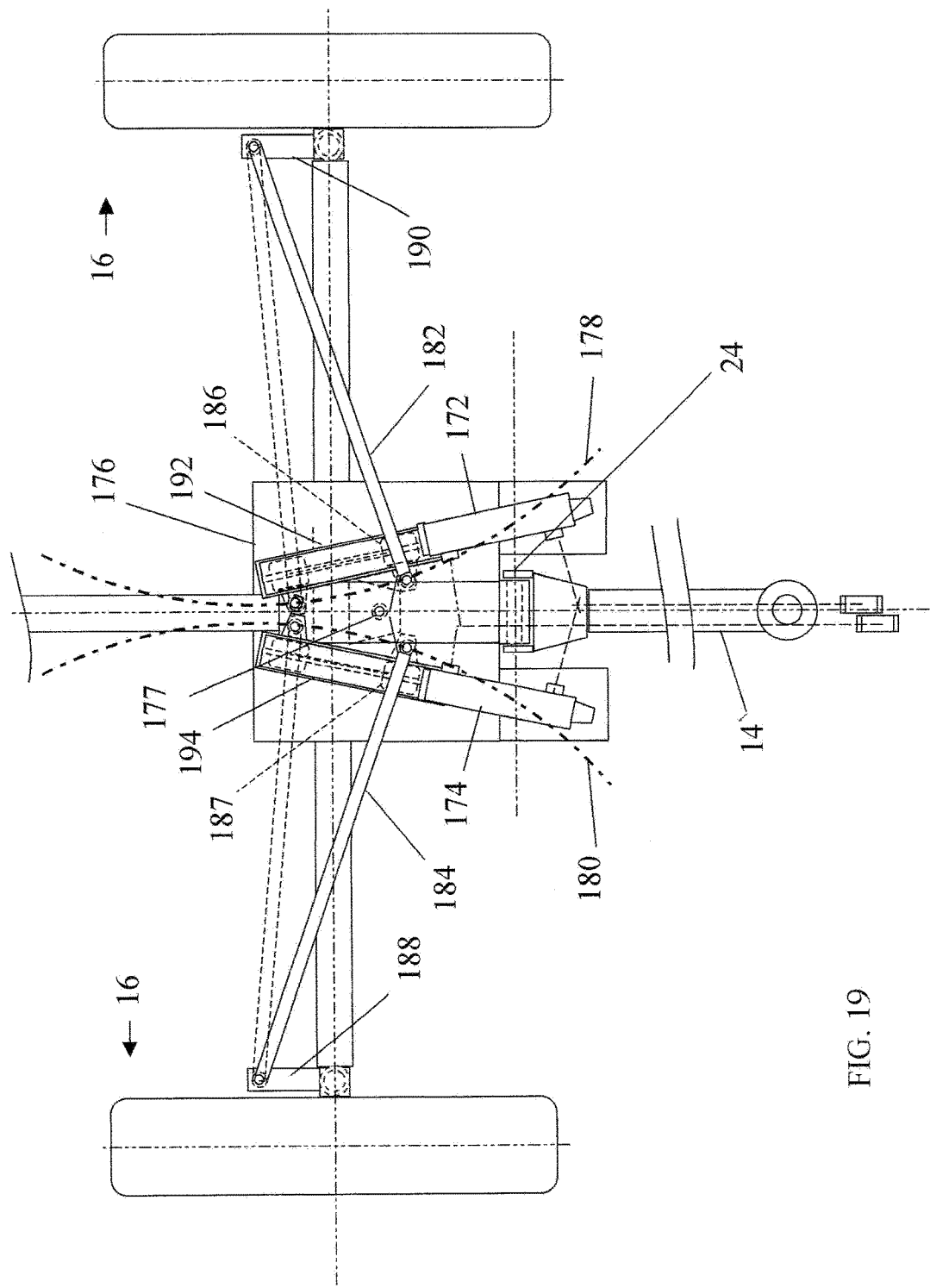
FIG. 19 is a top view of another embodiment of the invention.

Referring to FIG. 19, an embodiment is shown that uses double-acting hydraulic cylinders 172, 174 to steer each steered wheel 16. In this embodiment, a larger turntable 176 provides a mounting support for the hydraulic cylinders, and rotates about an axis 177. As shown, cylinders 172, 174 are angularly mounted with respect to a longitudinal axis of the trailer in order to accommodate curves 178, 180. Drawbar 14 is attached as described for vertical pivoting movement at axis 24. Connecting rods 182, 184 are mounted at one end to opposed stub shafts of respective carriages 186, 187 and at opposite ends to control arms 188, 190 of wheels 16. Carriages 186, 187 and respective slides 192, 194 may be configured as described for the embodiment of FIGS. 16-18 wherein there is a curved groove machined in upper and lower interior sides of the slides that match respective curves 178, 180, with the stubs attached to control rods 182, 184 engaging the interior curved grooves and being otherwise free to moved laterally within carriages 186, 187. As should be apparent, in this embodiment, steering of each wheel may be adjusted independently of one another, which may be an advantage under certain circumstances. In this embodiment, with carriages 186 and 187 in the position shown with control rods 182, 184 in solid lines, i.e. forward of pivot axis 177, a towing position, sideways displacement of the drawbar results in wheels 16 being steered in the same direction and extent as drawbar movement. With carriages 186, 187 positioned rearward of pivot axis 177, i.e. the dashed line positions of control rods 182, 184, wheels 16 are steered in opposite directions with respect to sideways drawbar displacement, resulting in a backing mode. As noted earlier, when backing, the carriage positions may be varied between the rearwardmost dashed line position shown to points approximately even with pivot axis 177 to increase or decrease sensitivity of steering with respect to towbar displacement.

Referring now to FIGS. 20-24, trailer steering operation is described. As earlier noted, trailer steering is operated between a towing position and a backing position for electric motor embodiments, as implemented manually by a two-position rocker switch or similar electrical control device. For hydraulic power embodiments, manual manipulation of standard hydraulic control levers for operation of hydraulic flow connected to one or more double acting hydraulic cylinders on the trailer effects switching between towing and backing positions. As noted earlier, a secondary lock, such as a pin that engages openings between a carriage and slide therein, may be used in some embodiments to serve as a safety lock or catch that locks the carriage to the slide at least in a towing position. An electrical interlock may also be used so as to apply wheel brakes or another feature that prevents the trailer from being towed if the safety pin or catch is not locked in place.

Figure 20:
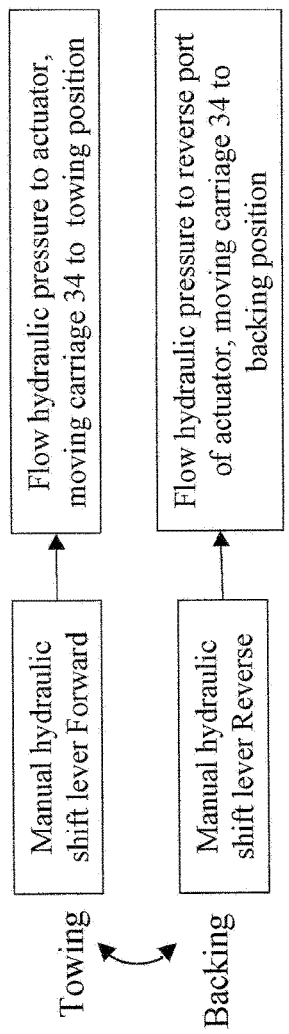
FIG. 20 is a flow diagram illustrating operation of a hydraulic version of the invention.
Figure 21:
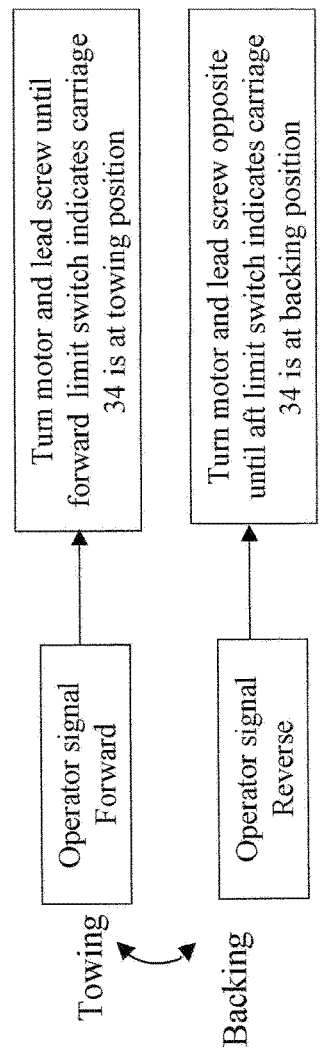
FIG. 21 is a flow diagram illustrating operation of an electrical embodiment of the invention.

FIG. 20 shows an operational flow diagrams for a hydraulic power embodiment and FIG. 21 shows an operational flow diagram for an electrically powered embodiment. These flow diagrams illustrate methods for operating the carriages in switching from a towing position to a backing position. In FIG. 20, the operator operates a hydraulic control to move a respective carriage between towing and backing positions using a hydraulic cylinder. When backing, the operator may adjust sensitivity of steering by manipulating the respective hydraulic levers. In FIG. 21, the operator manually operates a switch, such as a rocker switch, to energize an electric motor that turns a leadscrew to move and position the carriage between towing and backing positions. As with the hydraulic version, when in a backing position, the rocker switch may be used to adjust steering sensitivity for more or less steering with towbar displacement. FIG. 5 shows a bottom view of a steering system embodiment that steers wheels 16 of the front axle when towing and wheels 66 of the rear axle when backing. This embodiment is a two-position embodiment, i.e. without backing steering sensitivity adjustment, wherein the carriage moves bellcranks between towing and backing positions. When towing, towbar steering angle TSA is coupled to wheel steering angle WSA of front steered wheels, with the towbar moving in the same direction as the steered wheels; when backing towbar steering angle TSA is coupled to the angle WSA2 of rear steered wheels 126, also moving in the same direction as towbar 12 displacement. As noted, the non-steered wheels are decoupled from sideways towbar displacement and fixed in a straight ahead position. In this 2-position embodiment, hydraulic power is manually commanded to operate according to FIG. 20 and electric power is manually commanded according to FIG. 21, moving bell crank 68 with associated attachment legs and attachment steering knuckle pivot axes of corresponding connector rods to be coincident with axis 26 between towing and backing positions according to operator commands.

Figure 22:
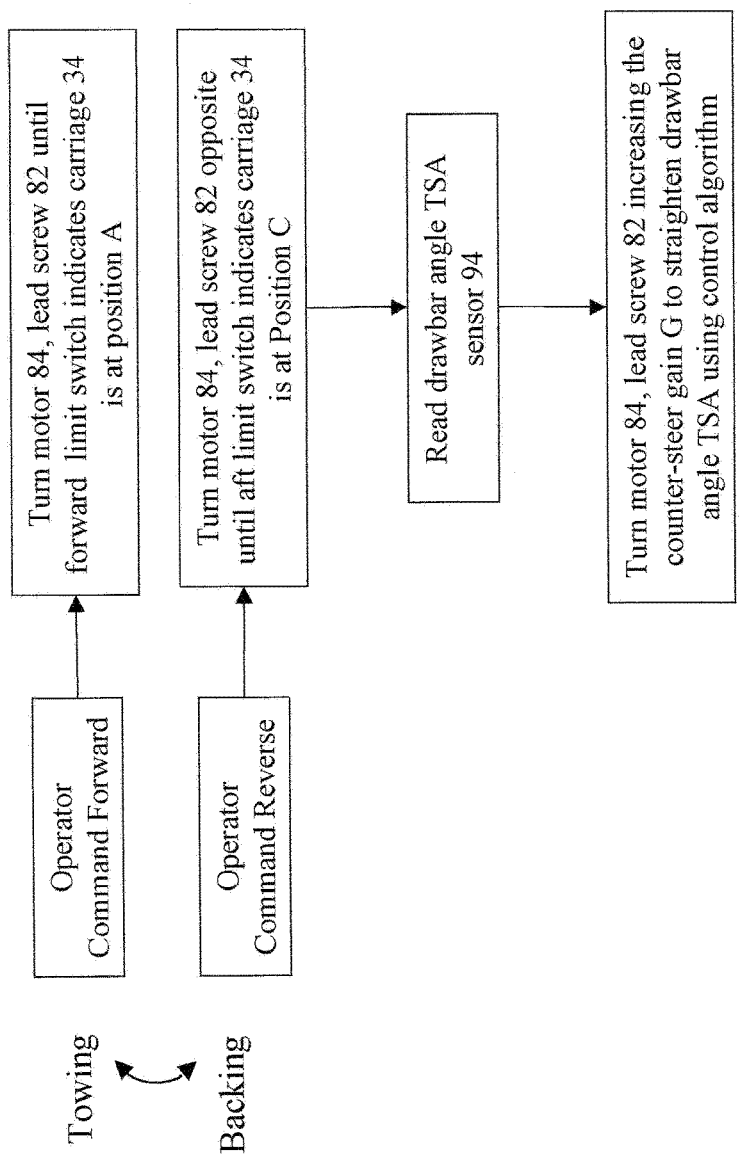
FIG. 22 is a flow diagram illustrating overall operation of an automatic version of the invention.
Figure 23:
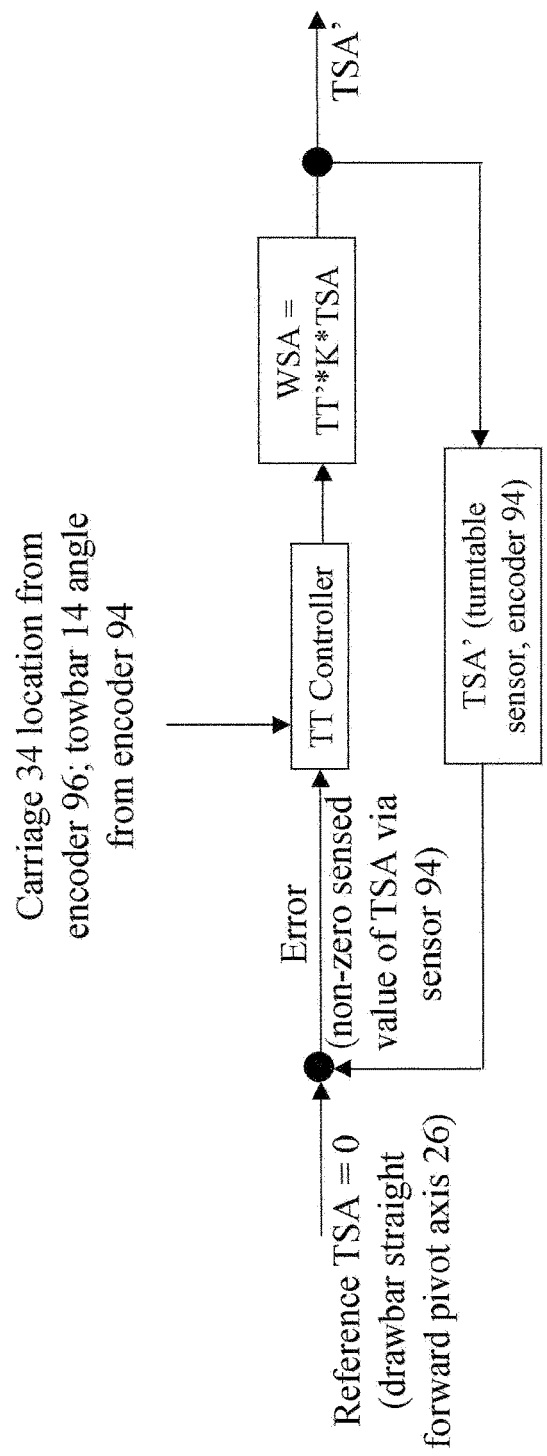
FIG. 23 is a flow diagram illustrating operation of one algorithm of the invention.
Figure 24:
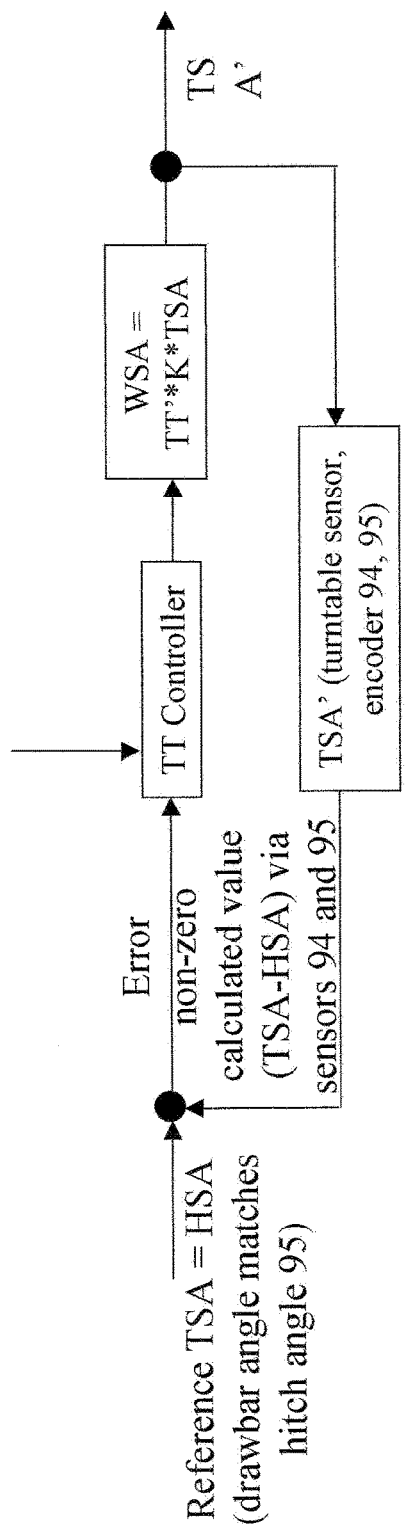
FIG. 24 is a flow diagram illustrating operation of another algorithm of the invention.

FIGS. 22-24 show an automatic control embodiment related to, by way of example, to FIG. 8, which shows an embodiment with a straight slide 30 and a continuously adjustable carriage 34 and control rod 86 attachment point. Towing and backing commands are initiated by the driver/operator in order to switch or move carriage 34 between position A for towing and position C for backing. Sensor 96 measures the carriage 34 position relative to slide 30, and sensor 94 (FIG. 9) measures the towbar angle TSA, relative to wagon chassis 60 and provide the state of those parameters to a microprocessor. When backing, as towbar angle TSA is moved from straight ahead, carriage 34 is moved rearward and further away from position B, toward position C and possibly as far as D as shown in FIG. 8, increasing the counter-steer in order to reduce towbar angle, TSA, until the drawbar is straight ahead according to the control algorithm shown in FIG. 22. Here, a first control algorithm is shown whereby a microprocessor uses sensor 94 (FIG. 9) measuring TSA and sensor 96 measuring or counting turns on the leadscrew, which in turn gives carriage 22 position. This algorithm is used to command motor 21 to turn the leadscrew to move carriage 22 between position B and position D in order to steer wheels 16 to minimize angle TSA. A second control algorithm is shown in FIG. 23 whereby a microprocessor uses sensor 94 measuring TSA, a sensor 95 (FIG. 8) measuring the hitch angle HSA, and sensor 96 measuring turns on the leadscrew as described. This control embodiment commands the leadscrew motor to turn the leadscrew to move the respective carriage between position B and position D (FIG. 8) in order to steer wheels 16 to match towbar angle TSA with hitch angle HSA.

In embodiments without a microprocessor, the operator commands reverse operation by first moving the carriage to position B, and second manually adjusting the carriage between position B and position D to accomplish controlled backing.

Having thus described my invention and the manner of its use, it should be apparent to those skilled in the relevant arts that incidental changes may be made that fairly fall within the scope of the following appended claims, wherein I claim:

1. A method for steering a trailer comprising:
 establishing a pivot point on said trailer about which a towbar for towing the trailer pivots horizontally,
 mounting one end of a connecting rod in steering relation to at least one steered wheel of said trailer,
 coupling an opposite end of said connecting rod to said towbar near said pivot point, said opposite end of said connecting rod coupled for movement with respect to said pivot axis, with a first position of said opposite end of said connecting rod being a towing position wherein said at least one steered wheel is steered in a same direction as a horizontal towbar movement, and a second position of said opposite end of said connecting rod being a backing position wherein said at least one steered wheel is steered in an opposite direction to said horizontal towbar movement, with a range of positions between said towing position and said backing position at which said opposite end of said connecting rod may be moved to,
 positioning said opposite end of said connecting rod at said towing position for steering said at least one steered wheel when towing said trailer, and positioning said opposite end of said connecting rod at any position in said range of positions for steering said at least one steered wheel during backing of said trailer.

2. The method of claim 1 wherein said positioning said opposite end of said connecting rod further comprises selecting said towing position to be to one side of said pivot axis, and selecting said backing position to be to another side of said pivot axis.

3. The method as set forth in claim 2 wherein the at least one steered wheel further comprises at least one other steered wheel of said trailer using a link between said at least one steered wheel and said at least one other steered wheel, so that at least two trailer wheels are steered.

4. The method as set forth in claim 3 wherein said at least one steered wheel and said at least one other steered wheel are front steered wheels of said trailer, and further comprising:
 coupling one end of a second link between steered rear wheels of said trailer, and coupling a second opposite end of said second link in said movable relation with respect to said pivot point,
 selecting movable positions of said opposite end of said connecting rod and said second opposite end of said second connecting rod so that one or the other are coaxial with said pivot axis, whereby a one of said opposite end of said connecting rod and said second opposite end of said second connecting rod that is coaxial with said pivot point performs no steering and maintains respective said front steered wheels and rear steered wheels in a straight ahead position, while the other of said opposite end of said connecting rod and said second opposite end of said second connecting rod steers respective said front steered wheels and said rear steered wheels.

5. The method as set forth in claim 2 wherein said positioning said opposite end of said connecting rod at any position in said range of positions further comprises varying a position of said opposite end of said connecting rod when backing to any position within said range of positions, thereby increasing or decreasing a steering wheel angle of said at least one steered wheel for a given sideways towbar displacement.

6. The method as set forth in claim 5 further comprising positioning said opposite end of said connecting rod at a position in said range of positions where no movement of said connecting rod occurs with said sideways towbar displacement and said at least one steered wheel is parallel with non-steered wheels, allowing said trailer to be backed straight without regard to sideways towbar displacement.

7. The method as set forth in claim 1 further comprising:
detecting a towbar angle relative to a centered position of said towbar,
detecting a position within said range of positions of said opposite end of said connecting rod,
selectively moving said opposite end of said connecting rod responsive to a detected said towbar angle and a detected said position of said opposite end of said connecting rod to selectively increase or decrease a steering angle of said at least one steered wheel independently of said towbar angle, thereby allowing backing of said trailer in a selected direction along a selected path.

8. The method as set forth in claim 7 wherein said moving said opposite end of said connecting rod to selectively increase or decrease said steering angle of said at least one steered wheel further comprises selectively moving said opposite end of said connecting rod to a position within said range of positions wherein any said towbar angle has no effect on said steering angle of said at least one steered wheel, allowing said trailer to be backed in a fixed direction without regard to said any towbar angle.

9. The method as set forth in claim 7 further comprising:
detecting an angle of said towbar with respect to a hitch on said tow vehicle,
moving said opposite end of said connecting rod to steer said at least one steered wheel in a direction such that said angle of said towbar with respect to said hitch is driven to match said towbar angle relative to said centered position of said towbar, thereby allowing said trailer to be backed along a selected curve.

10. The method as set forth in claim 1 further comprising powering or providing a power assist to at least some wheels of said trailer.

* * * * *